United States Patent
Lee et al.

(10) Patent No.: US 11,484,845 B2
(45) Date of Patent: Nov. 1, 2022

(54) HYBRID MEMBRANE COMPRISING ZEOLITIC IMIDAZOLATE FRAMEWORK NANOPARTICLES AND METHOD OF GAS SEPARATION USING THE SAME

(71) Applicant: SOGANG UNIVERSITY RESEARCH & BUSINESS DEVELOPMENT FOUNDATION, Seoul (KR)

(72) Inventors: Jong Suk Lee, Seoul (KR); Kie Yong Cho, Seoul (KR); Jin Won Lee, Seoul (KR); Byung Keun Oh, Seoul (KR); Jeong Geol Na, Seoul (KR); He Seong An, Seoul (KR)

( * ) Notice: Subject to any disclaimer, the term of this patent is extended or adjusted under 35 U.S.C. 154(b) by 137 days.

(21) Appl. No.: 16/659,656

(22) Filed: Oct. 22, 2019

(65) Prior Publication Data

US 2020/0122095 A1    Apr. 23, 2020

(30) Foreign Application Priority Data

Oct. 23, 2018   (KR) .................. 10-2018-0126829
Oct. 18, 2019   (KR) .................. 10-2019-0129542

(51) Int. Cl.
| | |
|---|---|
| B01D 69/14 | (2006.01) |
| C08K 5/56 | (2006.01) |
| C08J 5/18 | (2006.01) |
| B01D 53/22 | (2006.01) |
| B01D 71/64 | (2006.01) |
| B01D 69/02 | (2006.01) |

(52) U.S. Cl.
CPC ......... *B01D 69/141* (2013.01); *B01D 53/228* (2013.01); *B01D 69/02* (2013.01); *B01D 71/64* (2013.01); *C08J 5/18* (2013.01); *C08K 5/56* (2013.01); *B01D 2325/02* (2013.01); *B01D 2325/04* (2013.01); *C08J 2379/08* (2013.01)

(58) Field of Classification Search
None
See application file for complete search history.

(56) References Cited

U.S. PATENT DOCUMENTS

| | | | | |
|---|---|---|---|---|
| 2014/0050856 | A1* | 2/2014 | Kurahashi | B01D 53/228 427/372.2 |
| 2015/0101986 | A1* | 4/2015 | Odeh | B01D 53/228 210/640 |
| 2018/0272288 | A1* | 9/2018 | Choi | B01D 53/228 |
| 2021/0130372 | A1* | 5/2021 | Smith | B01D 71/64 |

OTHER PUBLICATIONS

Gross, Adam F. et al., "Aqueous room temperature synthesis of cobalt and zinc sodalite zeolitic imidizolate frameworks", Dalton Transactions, 2012, 41, pp. 5458-5460. (Year: 2012).*

(Continued)

*Primary Examiner* — Jason M Greene
(74) *Attorney, Agent, or Firm* — Antonio Ha & U.S. Patent, LLC

(57) ABSTRACT

The present invention relates to a hybrid membrane mixed with nanoparticles including a zeolitic imidazolate framework (ZIF), and a gas separation method using the same. A hybrid membrane according to the present invention comprises a polymer matrix, and nanoparticles which are dispersed in the polymer matrix and include the ZIF.

14 Claims, 21 Drawing Sheets
(19 of 21 Drawing Sheet(s) Filed in Color)

(56) References Cited

OTHER PUBLICATIONS

Nordin, N.A.H.M. et al., "Aqueous room temperature synthesis of zeolitic imidazole framework 8 (ZIF-8) with various concentrations of triethylamine", RSC Advances, 2014, 4, pp. 33292-33300. (Year: 2014).*

Brian R. Pimentel et al., Zeolitic Imidazolate Frameworks: Next-Generation Materials for Energy-Efficient Gas Separations, ChemSusChem 2014, 7, 1?40, Received: Jul. 8, 2014.

* cited by examiner

HYBRID MEMBRANE COMPRISING ZEOLITIC IMIDAZOLATE FRAMEWORK NANOPARTICLES AND METHOD OF GAS SEPARATION USING THE SAME

CROSS-REFERENCE TO RELATED APPLICATIONS

This non-provisional U.S. Patent Application claims priority under 35 U.S.C. § 119 to Korean Patent Application Nos. 10-2018-0126829 filed on Oct. 23, 2018 and 10-2019-0129542 filed on Oct. 18, 2019, the disclosures of which are incorporated by reference herein in their entireties.

BACKGROUND OF THE INVENTION

Field of the Invention

The present invention relates to a hybrid membrane in which zeolitic imidazolate framework (ZIF) nanoparticles with improved compatibility with polymer are uniformly dispersed in a polymer matrix, and a method of gas separation using the hybrid membrane.

Related Art

Metal organic frameworks (MOFs), as a microporous crystalline material comprised of metal atoms or metal clusters and an organic ligand which connects the metal atoms or metal clusters by a coordinate bond, are a relatively new hybrid organic-inorganic material.

Pore sizes and physical/chemical properties of MOFs can be adjusted by selection of appropriate metal atoms and organic ligand.

Further, hybrid-based MOFs can be synthesized by substituting metal atoms and an organic ligand which are elements of MOFs with other metal atoms and organic ligand through an additional chemical reaction of MOFs, and pore sizes and physical/chemical properties can also be additionally adjusted depending on their substitution extents. Due to such specified properties of MOFs, MOFs have been shown gas storage and/or absorption, catalytic action, and potential applicability as a separation membrane.

Particularly, zeolitic imidazolate frameworks (ZIFs), as a subordinate concept of MOF, are composed of metal nodes (generally, zinc or cobalt) connected to an imidazolate (or imidazolate derivative) ligand.

SUMMARY OF THE INVENTION

The present invention provides a hybrid membrane in which zeolitic imidazolate framework (ZIF) nanoparticles with improved compatibility with polymer are uniformly dispersed in a polymer matrix, and a method of gas separation using the hybrid membrane.

However, objects to be solved by the present invention are not limited to the above-mentioned objects, and other objects that are not mentioned may be clearly understood by those skilled in the art in the following description.

In an aspect, a hybrid membrane comprising a polymer matrix and nanoparticles which are dispersed in the polymer matrix and include a zeolitic imidazolate framework (ZIF) is provided.

The nanoparticles may include: metal ions; and an organic ligand coupled to the metal ions, and the organic ligand may include an imidazolate-based organic ligand and an alkylamine-based organic ligand.

At least one of a distance between crystal surfaces, and distribution and coupling strength of the crystal surfaces in the nanoparticles is adjusted according to use ratio of the alkylamine-based organic ligand, and the alkylamine-based organic ligand may be directly combined with the metal ions.

In the organic ligand, a ratio of the imidazolate-based organic ligand to the alkylamine-based organic ligand may be 99.9 wt %:0:0.1 wt % to 80 wt %:20 wt %.

A distance between (011) crystal surfaces of the AZIF nanoparticles may be 11.9 Å to 12.15 Å when the metal ions are cobalt, and a distance between (011) crystal surfaces of the AZIF nanoparticles may be 12.0 Å to 12.25 Å when the metal ions are zinc.

The nanoparticles may have a particle size of 100 nm or less and a pore size of 0.1 to 1 nm.

The nanoparticles may exhibit a mass decrease of 3% or less within 400° C. in thermogravimetric analysis (TGA) test, an IR peak of Co—N of the AZIF nanoparticles may be increased as much as 1 to 3 $cm^{-1}$ by the alkylamine-based organic ligand when the metal ions are cobalt, and an IR peak of Zn—N of the AZIF nanoparticles may be increased as much as 1.5 to 4 $cm^{-1}$ by the alkylamine-based organic ligand when the metal ions are zinc.

The membrane may comprise 15 to 60 wt % of the nanoparticles.

The membrane may comprise 30 to 60 wt % of the nanoparticles.

The membrane may have a thickness of 50 nm to 100 μm.

The polymer matrix may be formed by comprising any one selected from the group consisting of polyimide, polysulfone (PSF), polyethersulfone (PES), cellulose acetate (CA), polydimethylsiloxane (PDMS), and polyvinyl acetate (PVAc).

The membrane enables gases with a molecular size difference of 0.1 to 5 Å to be separated from each other.

The membrane may separate a mixed gas of a gas set selected from the group of gas sets consisting of $C_3H_6/C_3H_8$, $C_2H_4/C_2H_6$, $CO_2/CH_4$, $CO_2/CO$, $CO_2/N_2$, $N_2/CH_4$, n-$C_4$/i-$C_4$ (n-butane/iso-butane), $H_2/CH_4$, $H_2/C_3H_8$, and $H_2/C_3H_6$.

The nanoparticles may have a permeability to $C_3H_6$ of 200 to 400 Barrer and a $C_3H_6/C_3H_8$ selectivity of 270 to 400 at 35° C. when a central atom of the nanoparticles is cobalt, and the nanoparticles may have a permeability to $C_3H_6$ of 300 to 600 Barrer and a $C_3H_6/C_3H_8$ selectivity of 140 to 300 at 35° C. when the central atom of the nanoparticles is zinc.

The central atom of the nanoparticles includes zinc, and the membrane may have a permeability to $C_3H_6$ of 40 to 80 Barrer and a $C_3H_6/C_3H_8$ selectivity of 22 to 40 at 35° C.

The central atom of the nanoparticles includes cobalt, and the membrane may have a permeability to $C_3H_6$ of 40 to 70 Barrer and a $C_3H_6/C_3H_8$ selectivity of 33 to 60 at 35° C.

The central atom of the nanoparticles includes cobalt, and the membrane may have a $C_3H_6/C_3H_8$ energetic selectivity of 1,000 to 10,000.

In other aspect, a gas separation method comprising the step of separating one or more gases from a mixed gas including two or more gases using the hybrid membrane is provided.

The gas separation method comprises passing the mixed gas through the membrane, thereby enabling gases to be separated from each other using a molecular size difference of gases included in the mixed gas.

The gases included in the mixed gas may have a molecular size difference of 0.1 to 5 Å.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXEMPLARY EMBODIMENTS

Figure 1:
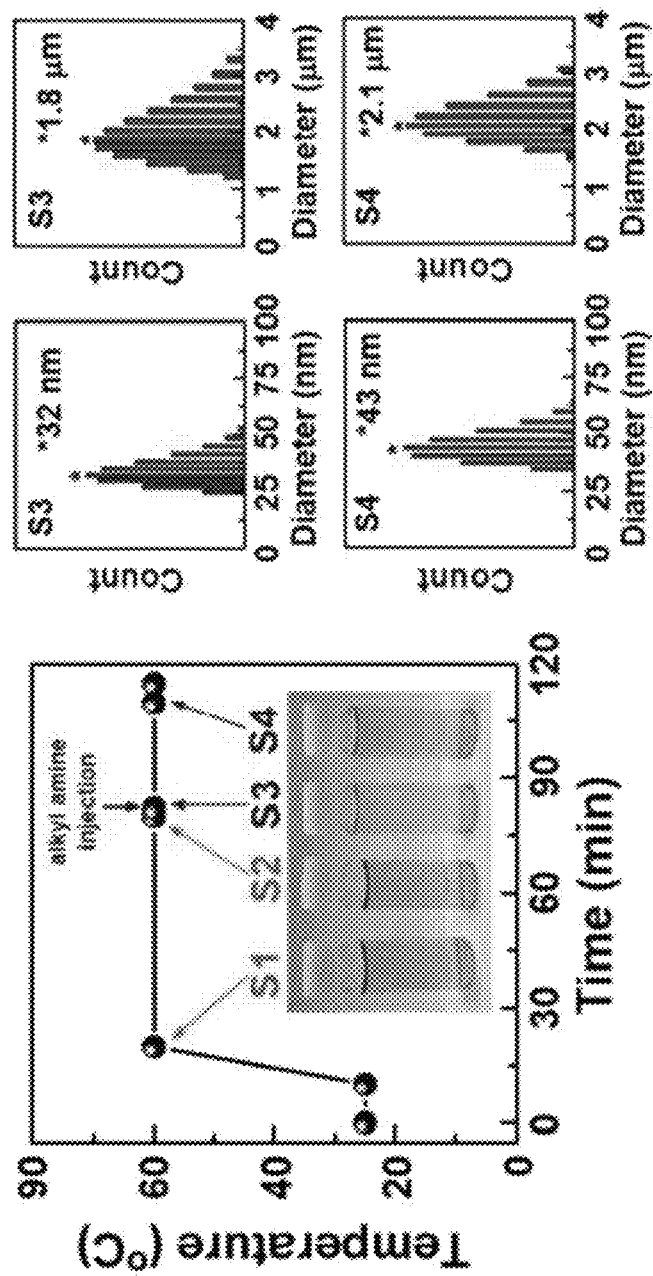
FIG. 1 is graphs illustrating results of a synthesis process of AZIF-67 nanoparticles as a reaction temperature change according to time and analyzing colors of solutions in respective steps at this time and changes in particle sizes at this time by dynamic light scattering (DLS) spectroscopy in an embodiment of the present invention.

Hereinafter, preferred embodiments and examples of the present invention will be described in detail with reference to the annexed drawings so that those skilled in the art will easily be able to implement the present invention. However, the present invention may be implemented in various forms and not limited to the embodiments and examples described herein. A part having no relationship with the description is omitted to clearly describe the present invention in the drawings, and similar constituent element is indicated by similar reference numeral throughout the present specification.

In the whole present specification, when a part is "connected" to the other part, the parts are not only "directly connected" to each other, but also "indirectly connected" to each other while interposing another member therebetween.

In the whole present specification, when any member is positioned "on" the other member, this not only includes a case that the any member is brought into contact with the other member, but also includes a case that another member exists between two members.

In the whole present specification, if a prescribed part "includes" a prescribed element, this means that another element can be further included instead of excluding other elements unless any particularly opposite description exists.

When unique manufacture and material allowable errors of numerical values are suggested to mentioned meanings of terms of degrees used in the present invention such as "about", "substantially", etc., the terms of degrees are used as the numerical values or as a meaning near the numerical values, and the terms of degrees are used to prevent that an unscrupulous infringer unfairly uses a disclosure content in which extract or absolute numerical values are mentioned to help understanding of the present invention.

Term of degree used in the whole present specification such as "a step doing ~" or "a step of ~" does not mean "a step of for ~".

In the whole present specification, a term of "combination(s) thereof" included in a Markush type expression, which means a mixture or combination of one or more selected from the group consisting of elements described in the Markush type expression, means including one or more selected from the group consisting of the elements.

In the whole present specification, description of "A and/or B" means "A or B", or "A and B".

In the whole present specification, "nanoparticles comprising a zeolitic imidazolate framework" may be abbreviated as "nanoparticles having a ZIF" or "ZIF nanoparticles". Further, "nanoparticles including a zeolitic imidazolate framework which are controlled in a crystal structure while comprising an imidazolate-based organic ligand and an alkylamine-based organic ligand, i.e., a non-imidazolate-based organic ligand" may be abbreviated as "nanoparticles having AZIF", "AZIF nanoparticles", or "nanoparticles" in some cases.

In the present specification, ZIF-67 nanoparticles and AZIF-67 nanoparticles indicate nanoparticles of which metal ions are cobalt, while ZIF-8 nanoparticles and AZIF-8 nanoparticles indicate nanoparticles of which metal ions are zinc. For example, AZIF-67-Bu$_3$N$_5$ nanoparticles indicate AZIF nanoparticles which prepared by injecting a tertiary butylamine as an alkylamine at a molar ratio of five times that of a metal ion precursor and metal ions are cobalt. Indication of other AZIF nanoparticles than those nanoparticles can be understood through the above example.

Although a case that a hybrid membrane is mainly used as a separation membrane of gas is described as an example in the following description, uses of a hybrid membrane of the present invention are not limited thereto.

Hereinafter, preferred embodiments and examples of the present invention will be described in detail with reference to the annexed drawings. However, the present invention is not be limited to such embodiments, examples and drawings.

In AZIF nanoparticles according to an embodiment of the present invention comprising an imidazolate-based organic ligand including a zeolitic imidazolate framework, and an alkylamine-based organic ligand, i.e., a non-imidazolate-based organic ligand different from the imidazolate-based organic ligand at the same time, although examples of an alkylamine type, i.e., the non-imidazolate-based organic ligand different from the imidazolate-based organic ligand may include ethyl amine, propyl amine, butyl amine, diethyl amine, dipropyl amine, dibutyl amine, diethyl amine, tripropyl amine, tributyl amine, etc., the examples of the alkylamine type are not limited thereto.

Figure 2:
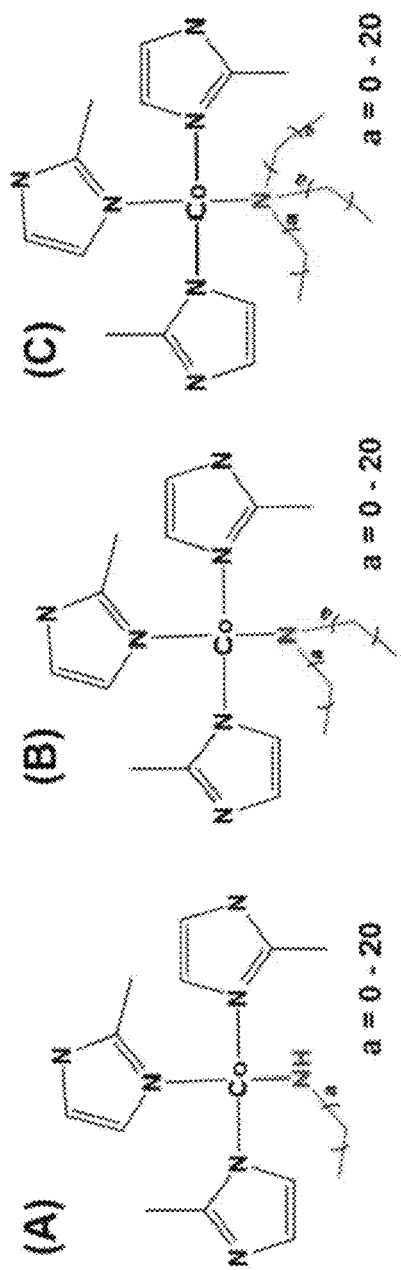
FIG. 2 is basic structural formulas which can be represented when synthesizing AZIF-67 nanoparticles using various alkylamines.

In an embodiment of the present invention, the alkylamine includes primary, secondary and/or tertiary amines and includes alkyl chains with various lengths (FIG. 2). For example, although alkyl chains may include one or more of methyl, ethyl, propyl, butyl, pentyl, hexyl, heptyl, octyl, nonyl, decyl, undecyl, dodecyl, propadecyl, butadecyl, pentadecyl, hexadecyl, heptadecyl, octadecyl and nonadecyl, the alkyl chains are not limited thereto.

In an embodiment of the present invention, a ratio of an imidazolate-based organic ligand to an alkylamine-based organic ligand in AZIF nanoparticles may be 99.9 wt %/0: 0.1 wt % to 80 wt %/0:20 wt % (Table 1).

In an embodiment of the present invention, a distance between crystal surfaces of AZIF nanoparticles may be decreased compared to ZIF nanoparticles. More specifically, when comparing (011) crystal surfaces of AZIF-67 nanoparticles with those of ZIF-67 nanoparticles, a distance D between (011) crystal surfaces has been decreased as much as about 0.2 Å from 12.30 Å to 12.15 Å (FIG. 3), and the distance may be adjusted according to an extent that tributylamine is introduced. However, the distance between the crystal surfaces has been maximally decreased at a molar ratio of tributylamine introduced during synthesis of about 5, and the distance between the crystal surfaces has not been changed anymore although tributylamine is introduced in that amount or more. A change between the crystal surfaces may be varied by chemical bonding strength between metal ions and an organic ligand, interaction energy between the organic ligands and gradient variation due to size of the organic ligand, and may be affected by mechanical coupling strength between coupling materials, i.e., properties inherently possessed by a specific material. When a second organic ligand is introduced, changes in such crystal structure and properties may affect pore structure of AZIF nanoparticles accordingly. However, a change itself in the distance between the crystal surfaces does not give a specific tendency to a change in the pore structure of AZIF nanoparticles, but pore structure and pore size may be variably changed according to chemical or mechanical coupling strength between the metal ions and the organic ligand, the interaction energy between the organic ligands, and gradient degree under spatial conditions as described above.

A distance between (011) crystal surfaces of AZIF-67 nanoparticles may be 11.9 Å to 12.15 Å, and a distance between (011) crystal surfaces of AZIF-8 nanoparticles may be 12.0 Å to 12.25 Å.

Figure 3:
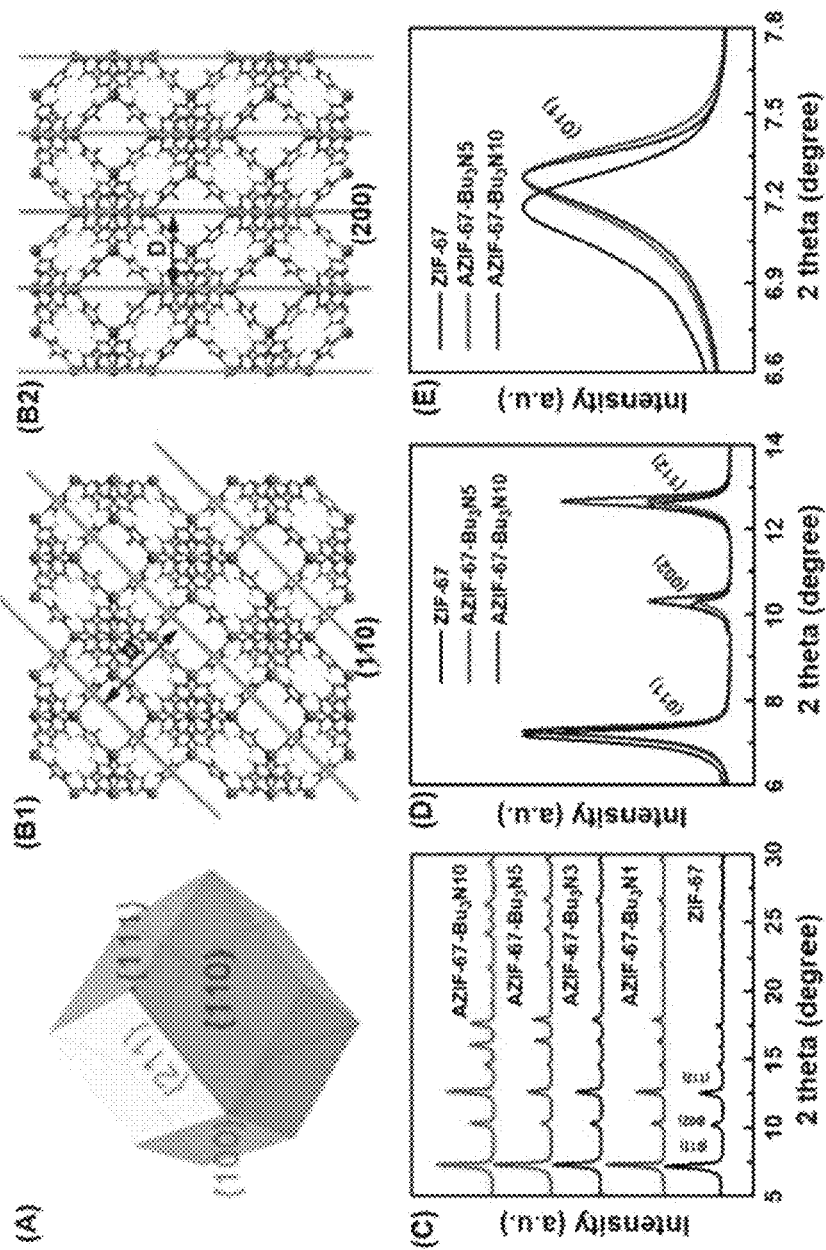
FIG. 3 is figures of illustrating a structure of rhombic octahedron, i.e., a structure of nanoparticles, (110) and (200) crystal surfaces, and a distance between the crystal surfaces and X-ray diffraction (XRD) graphs illustrating AZIF-67 nanoparticles obtained according to an amount of $Bu_3N$ introduced into a reaction solution when synthesizing AZIF-67 nanoparticles in an embodiment of the present invention.
Figure 4:
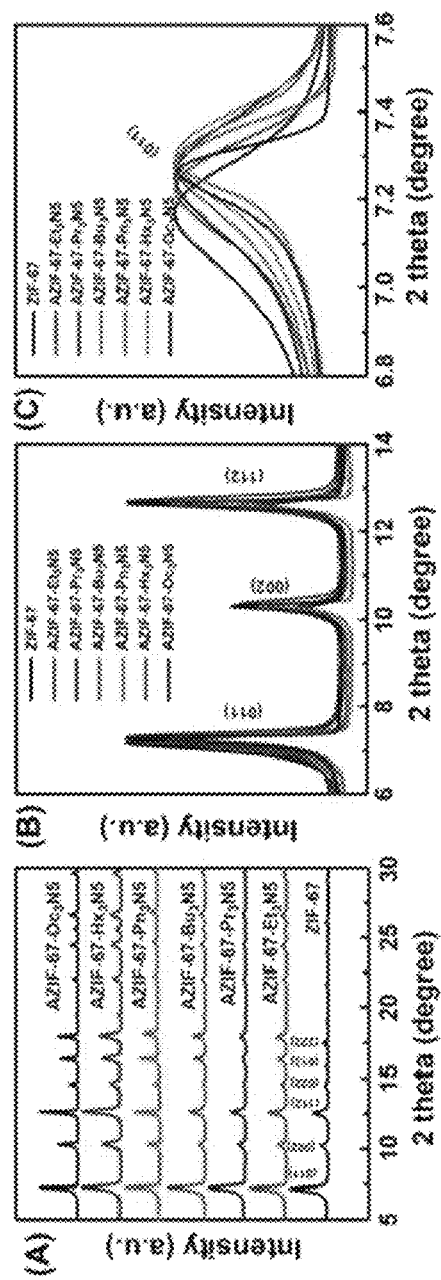
FIG. 4 is XRD graphs illustrating AZIF-67 nanoparticles into which various alkylamines are introduced synthesized according to an embodiment of the present invention.

In an embodiment of the present invention, when an excessive amount of tributylamine is introduced during synthesis, (022) and (112) crystal surfaces may be grown to be little larger than (011) crystal surface (FIG. 3). Further, although growth ratios of respective crystal surfaces are similar at a molar ratio of tributylamine of 2 to 5 compared to a metal precursor, the (022) and (112) crystal surfaces may be grown to be little larger than the (011) crystal surface when the molar ratio is 10 (FIG. 3). In such a phenomenon, a phase of alkylamine in a solution may be increased as much as methanol during growth of AZIF-67 nanoparticles. At this time, due to maximization of interaction with the (011) crystal surface, the AZIF-67 nanoparticles may have a little more dominant growth on the (022) and (112) crystal surfaces. This tendency can be confirmed through large growth of the (022) and (112) crystal surfaces although a molar ratio of trihexylamine to the metal precursor of 5 is used when trihexylamine with low compatibility with methanol is used as a second organic ligand in an embodiment of the present invention (FIG. 4). Meanwhile, using triethylamine and tripropylamine having good compatibility with a methanol solvent such as tributylamine may show a tendency similar to that shown when using tributylamine.

Figure 5:
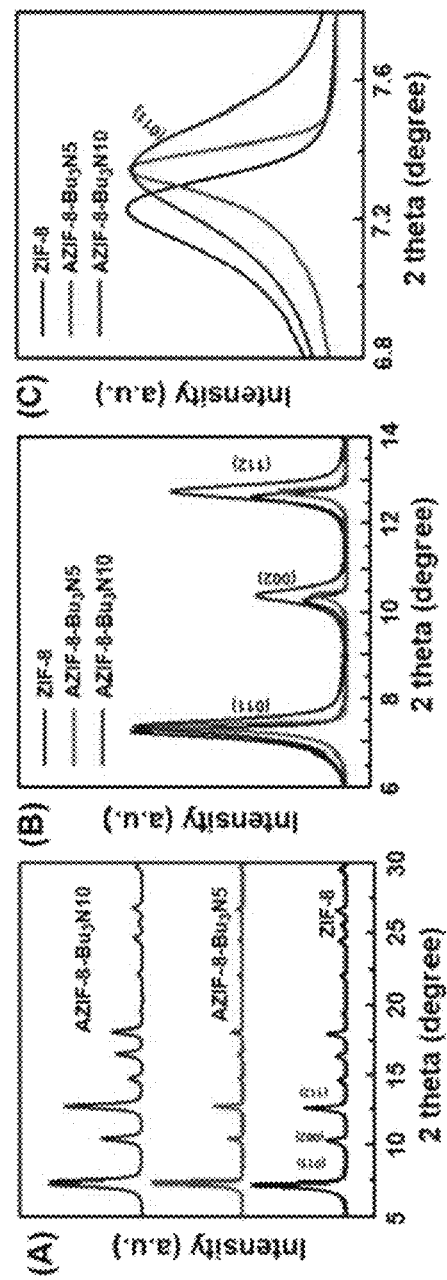
FIG. 5 is XRD graphs illustrating AZIF-8 nanoparticles synthesized according to an embodiment of the present invention.

In an embodiment of the present invention, when comparing crystal structure of AZIF-8 nanoparticles with that of general ZIF-8 nanoparticles, a change in crystal characteristics of a tendency similar to that of AZIF-67 nanoparticles has been shown (FIG. 5).

In an embodiment of the present invention, although size of nanoparticles may be 100 nm or less, and may be 5 to 100 nm, or 5 to 50 nm (FIG. 1 and FIG. 6), the size of nanoparticles is not limited thereto. Although the size of nanoparticles may be varied according to types of the metal precursor, the size of nanoparticles may be 100 nm or less, i.e., a particle size which is suitable for production of a mixed matrix membrane (MMM) and can exhibit high gas separation performance. In general, since the smaller the particle size is, the more specific surface area brought into contact with polymer is increased, the small particle size contributes to improvement in compatibility with the polymer. For example, although the size of the nanoparticles may be about 100 nm or less, about 80 nm or less, about 60 nm or less, about 50 nm or less, about 40 nm or less, about 30 nm or less, about 20 nm or less, about 10 nm or less, about 1 nm to about 100 nm, about 5 nm to about 50 nm, or about 10 nm to about 30 nm, the size of the nanoparticles is not limited thereto.

Figure 7:
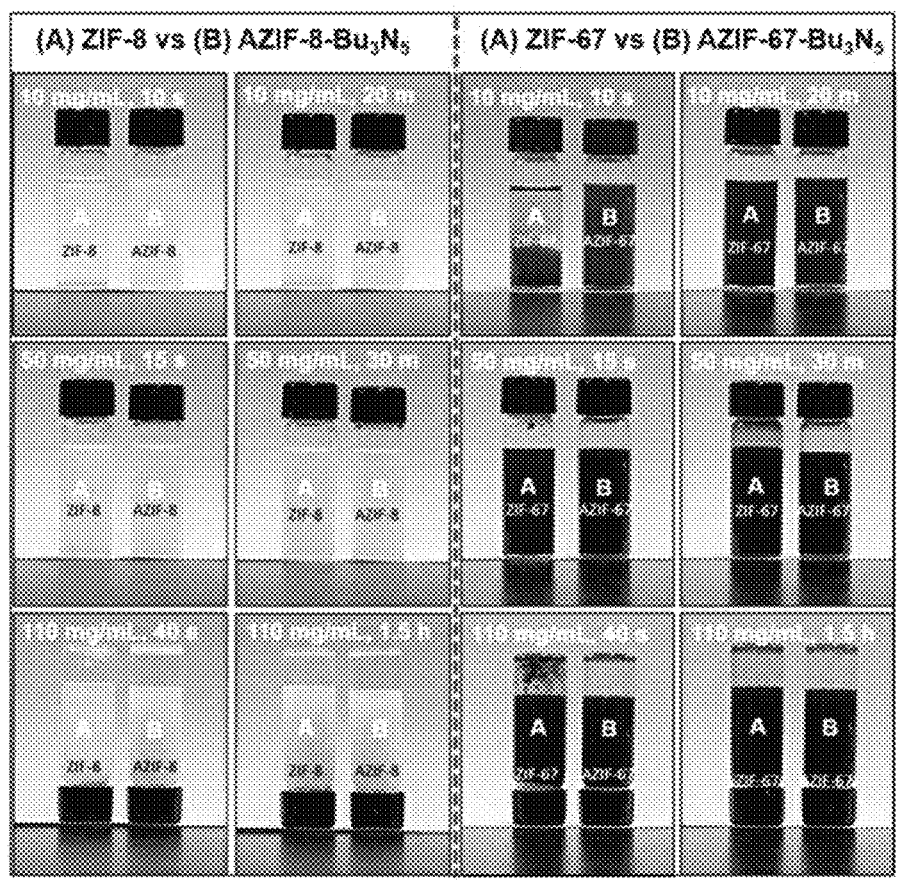
FIG. 7 is photographs showing dispersion degrees according to time of respective samples in which AZIF-8-$Bu_3N_5$ nanoparticles, general ZIF-8 nanoparticles, AZIF-67-$Bu_3N_5$ nanoparticles and general ZIF-67 nanoparticles are dispersed in an N-Methyl-2-pyrrolidone (NMP) solvent for each of concentrations in an embodiment of the present invention.

In an embodiment of the present invention, the nanoparticles may have improved dispersability in an organic solvent, particularly an amphiphilic solvent (FIG. 7). The organic solvent may include amphiphilic solvents such as N-methylpyrrolidone (NMP), dimethylformamide, etc., the organic solvent is not limited thereto.

In an embodiment of the present invention, although AZIF-67 and AZIF-8 nanoparticles may be dispersed to a concentration of about 110 mg/mL with respect to the organic solvent (FIG. 7), a dispersion concentration of the nanoparticles with respect to the organic solvent is not limited thereto. For example, although the dispersion concentration of the nanoparticles with respect to the organic solvent may be about 10 mg/mL to about 110 mg/mL, about 10 mg/mL to about 90 mg/mL, about 10 mg/mL to about 70 mg/mL, about 10 mg/mL to about 50 mg/mL, about 10 mg/mL to about 30 mg/mL, about 10 mg/mL to about 20 mg/mL, about 20 mg/mL to about 100 mg/mL, about 20 mg/mL to about 80 mg/mL, about 20 mg/mL to about 60 mg/mL, about 20 mg/mL to about 40 mg/mL, about 30 mg/mL to about 100 mg/mL, about 30 mg/mL to about 80 mg/mL, about 30 mg/mL to about 60 mg/mL, or about 30 mg/mL to about 40 mg/mL, the dispersion concentration is not limited thereto. Although the dispersion concentration can be about 110 mg/mL or more, an agglomeration phenomenon may occur.

In an embodiment of the present invention, when dispersing AZIF-67-$Bu_3N_5$ nanoparticles or AZIF-8-$Bu_3N_5$ nanoparticles in NMP through sonication, there are advantages that the AZIF-67-$Bu_3N_5$ nanoparticles or AZIF-8-$Bu_3N_5$ nanoparticles can be dispersed by performing a water tank-type sonication treatment process for 1 minute or less at a high concentration of 110 mg/mL, and preferably even for 30 seconds or less at the high concentration, or even for 10 seconds or less at a low concentration of 10 mg/mL. Meanwhile, it has been confirmed that the ZIF-67 nanoparticles and ZIF-8 nanoparticles are not dispersed when performing a water tank-type sonication treatment process of ZIF-67 nanoparticles and ZIF-8 nanoparticles for the same time as the AZIF-67-$Bu_3N_5$ nanoparticles or AZIF-8-$Bu_3N_5$ nanoparticles, and it has been confirmed that complete dispersion of the ZIF-67 nanoparticles and ZIF-8 nanoparticles has not been performed in spite of the low concentration of 10 mg/mL, and precipitates are formed on the bottom at the same time when the sonication treatment process is stopped (FIG. 7). Concentrations and sonication times of respective samples are indicated in FIG. 7.

Figure 8:
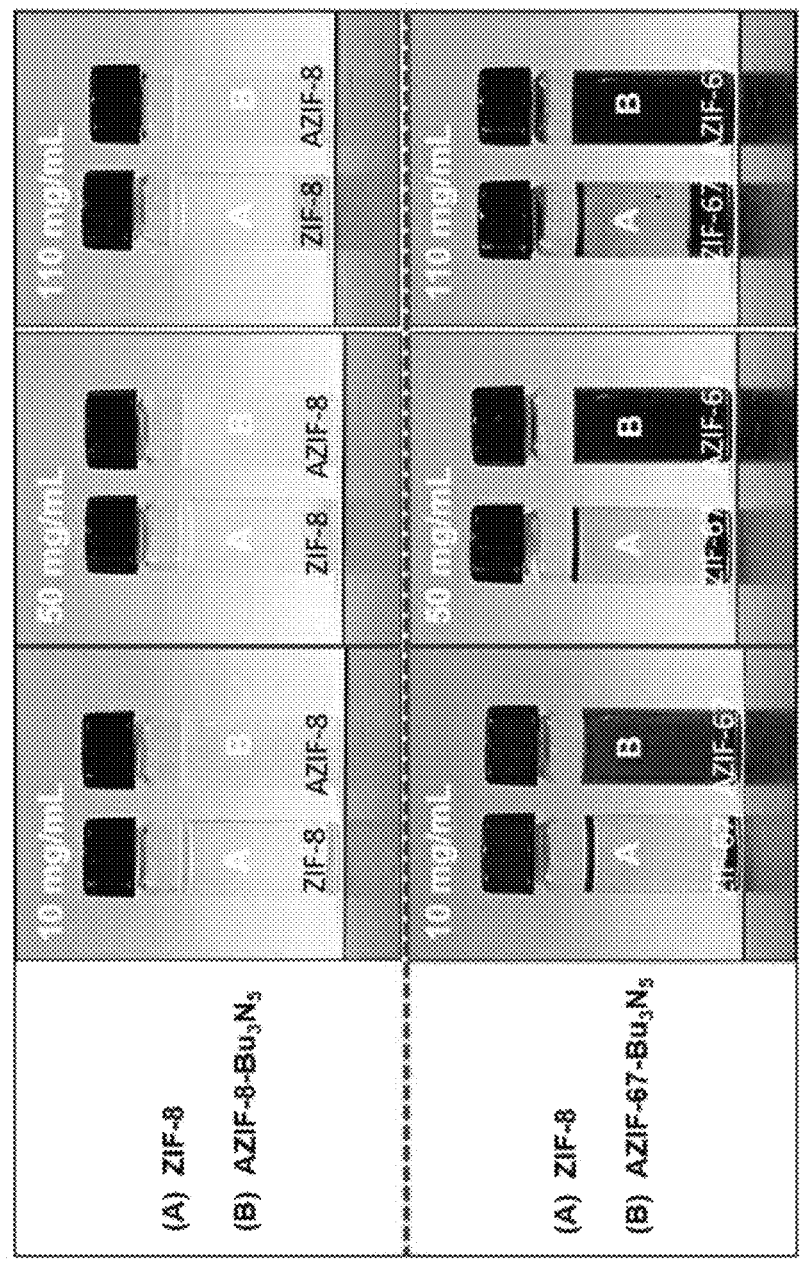
FIG. 8 is photographs showing dispersion stability degrees in 3 days after dispersing AZIF-67-$Bu_3N_5$ nanoparticles and general ZIF-67 nanoparticles in the NMP solvent for each of concentrations in an embodiment of the present invention.

In an embodiment of the present invention, the AZIF-67-$Bu_3N_5$ nanoparticles and AZIF-8-$Bu_3N_5$ nanoparticles may show long-term dispersion stability with respect to the organic solvent for a period of 3 days or 7 days (FIG. 8), the period is not limited thereto. FIG. 8 is photographs showing a state that test samples of FIG. 7 have been left alone for 3 days. More specifically, the AZIF-67-$Bu_3N_5$ nanoparticles or AZIF-8-$Bu_3N_5$ nanoparticles maintain their dispersabilities and do not generate precipitates even after 3 days even despite dispersion at a high concentration of 110 mg/mL after performing the water tank-type sonication treatment process for 40 seconds, while a phenomenon that almost all of the ZIF-67 and ZIF-8 nanoparticles are precipitated even at a low concentration of 10 mg/mL in 3 days after performing the water tank-type sonication treatment process for 20 minutes has been found. Long-term dispersion stability of the AZIF-67 and AZIF-8 nanoparticles developed through this could be confirmed (FIG. 8).

In an embodiment of the present invention, a pore size of AZIF nanoparticles may be about 1 nm or less, or about less than 1 nm. For example, although a pore size of nanoparticles comprising the zeolitic imidazolate framework may be about 0.1 nm to about 1 nm, about 0.1 nm to about 0.9 nm, about 0.1 nm to about 0.8 nm, about 0.1 nm to about 0.7 nm, about 0.1 nm to about 0.6 nm, about 0.1 nm to about 0.5 nm, about 0.2 nm to about 1 nm, about 0.2 nm to about 0.9 nm, about 0.2 nm to about 0.8 nm, about 0.2 nm to about 0.7 nm, about 0.2 nm to about 0.6 nm, or about 0.2 nm to about 0.5 nm, the pore size of the nanoparticles is not limited thereto.

Although ZIF-7 nanoparticles, ZIF-67 nanoparticles and ZIF-8 nanoparticles have been known to have pore sizes of 0.29 nm, 0.33 nm and 0.34 nm respectively based on XRD analysis results, various pore sizes can be adjusted by substituting types of metals and ligands according to embodiments of the present invention.

Figure 9:
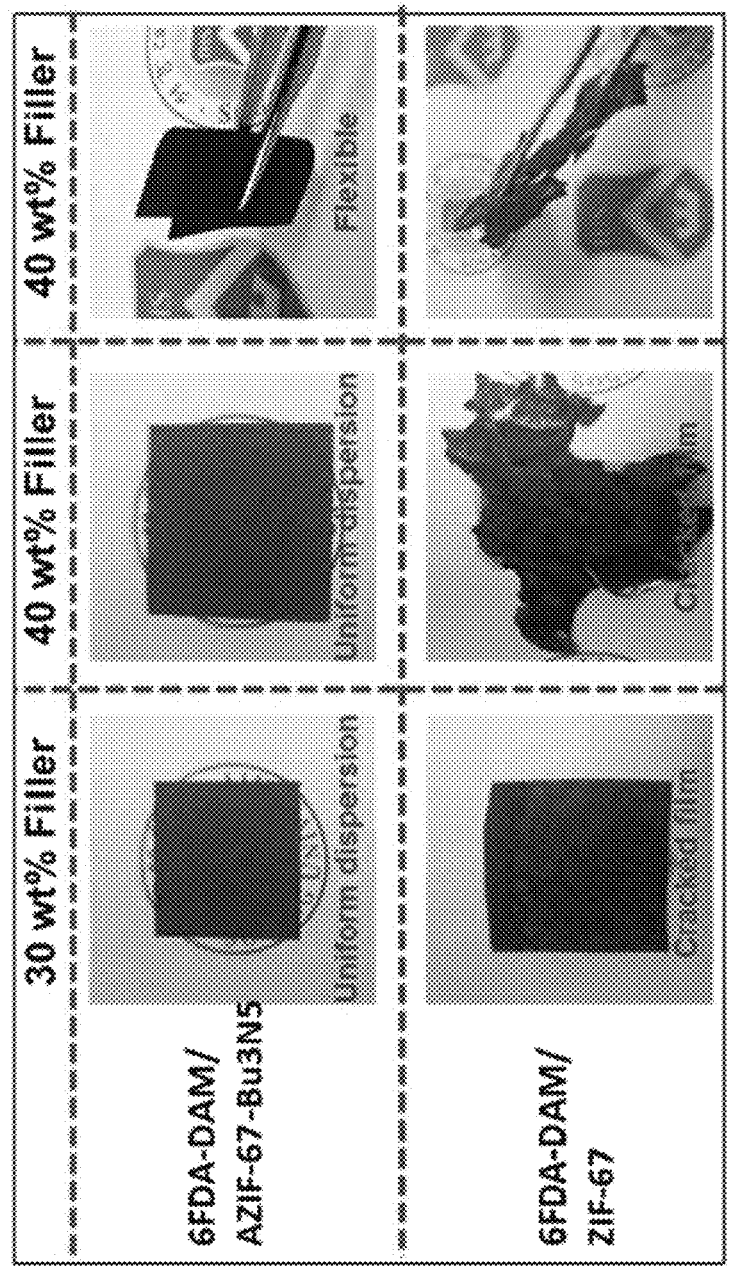
FIG. 9 is photographs showing hybrid membranes produced when dispersing AZIF-67 nanoparticles and general ZIF-67 nanoparticles in a 6FDA-DAM polyimide (PI) polymer in high concentrations in an embodiment of the present invention.
Figure 10:
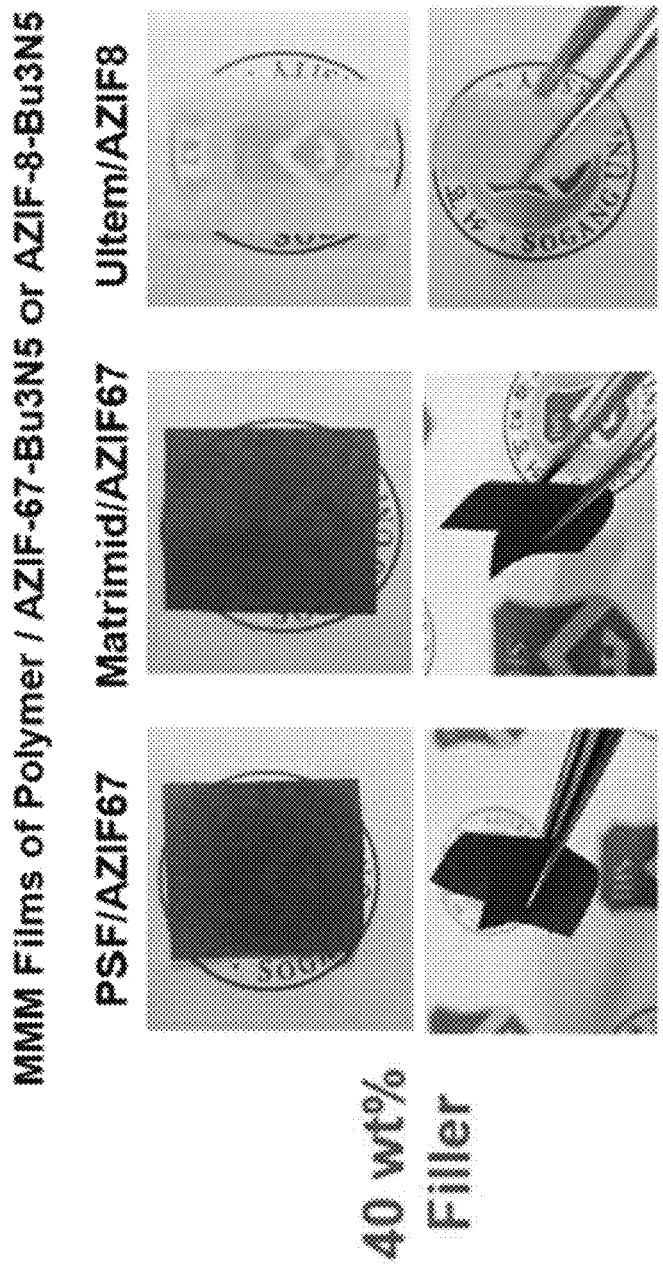
FIG. 10 is photographs showing hybrid membranes produced by dispersing AZIF-67 nanoparticles and AZIF-8 nanoparticles in various polymers including PSF- and PI-based polymers in a high concentration in an embodiment of the present invention.

In an embodiment of the present invention, hybrid membranes (composite film, composite membrane, hybrid film, separation membrane) obtained by dispersing AZIF-67 nanoparticles and/or AZIF-8 nanoparticles to a high concentration in a polymer matrix are provided (FIG. 9 and FIG. 10).

In an embodiment of the present invention, a content of AZIF nanoparticles dispersed in the polymer matrix in the hybrid membranes may be about 15 wt %, about 20 wt % or about 30 wt % or more based on the total weight of the separation membrane (FIG. 9). For example, the content of AZIF nanoparticles may be 15 wt %, 20 wt %, 30 wt %, 40 wt %, or 50 wt % or more. Although it is not limited thereto, an upper limit of the content may be 60 wt %, 70 wt % or 80 wt %. On the other hand, a nonuniform film has been produced even when ZIF-67 or ZIF-8 nanoparticles have been introduced in an amount of 30 wt %, and a hybrid membrane has not been produced when the ZIF-67 or ZIF-8 nanoparticles have been introduced in an amount of 40 wt %.

In an embodiment of the present invention, the hybrid membrane has flexible characteristics (FIG. 9). For instance, a hybrid membrane comprising 40 wt % of AZIF-67 nanoparticles shows folding characteristics without deforming an original form. Meanwhile, a hybrid membrane comprising 40 wt % of ZIF-67 nanoparticles shows a phenomenon that the hybrid membrane is easily broken.

In an embodiment of the present invention, AZIF-67 and AZIF-8 nanoparticles introduced into the hybrid membrane can produce a hybrid membrane in which AZIF nanoparticles are introduced to a high concentration into various engineering polymer materials as well as a polyimide-based polymer matrix (FIG. 10). For instance, a hybrid membrane can be produced when 40 wt % of AZIF nanoparticles is introduced into a polysulfone polymer material, and the hybrid membrane also shows flexible characteristics (FIG. 10).

A polymer used in a hybrid membrane of the present invention may include general vitric materials or rubbery materials. Specifically, although the polymer may include at least one of polyimide, polysulfone (PSF), polyethersulfone (PES), cellulose acetate (CA), polydimethylsiloxane (PDMS), and polyvinyl acetate (PVAc), the polymer is not limited thereto. Further, the polymer may include a polymer of intrinsic microporosity.

Figure 11:
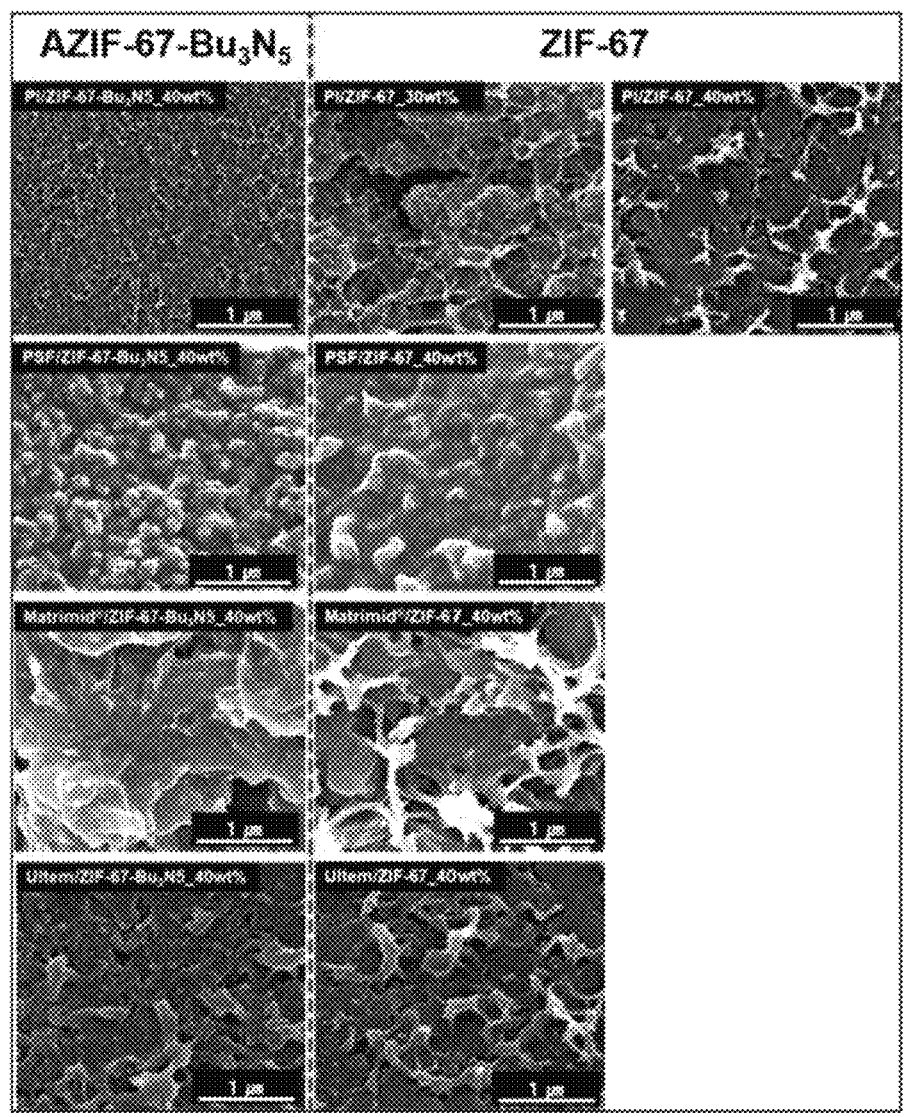
FIG. 11 is images obtained by analyzing cross sections of hybrid membranes produced by dispersing AZIF-67 nanoparticles in various polymer materials through SEM in an embodiment of the present invention.

In an embodiment of the present invention, AZIF nanoparticles introduced into a hybrid membrane can be uniformly dispersed in the polymer even at a high concentration. For instance, a hybrid membrane having 40 wt % of AZIF nanoparticles introduced thereinto has a uniform surface without a phase separation phenomenon being occurred on a film surface (FIG. 9 and FIG. 10), and the AZIF nanoparticles are uniformly dispersed in various polymer types even in cross section of the membrane (FIG. 11). Meanwhile, when 30 wt % of ZIF-67 nanoparticles is introduced, a phenomenon that the particles are glomerated to each other is found.

In an embodiment of the present invention, the AZIF nanoparticles introduced into the hybrid membrane have high interfacial adhesion (or compatibility) with various engineering polymer materials including a polyimide-based polymer material (FIG. 11). For example, although the AZIF nanoparticles exhibit good interfacial adhesion with polymer materials including 6FDA-DAM, Ultem®, Matrimid 5218®, PSF, etc., the polymer materials are not limited thereto. Meanwhile, it has been found that clusters are formed in ZIF nanoparticles due to a phenomenon that the particles are agglomerated to each other, voids are formed in interfaces of the particles with the polymer (FIG. 11).

In an embodiment of the present invention, a hybrid membrane produced by dispersing AZIF nanoparticles to a high concentration in a polymer matrix may have a thickness of 50 nm or more, or 100 nm or more. Although an upper limit of the thickness is not limited, the upper limit of the thickness may be 10 µm, 50 µm, 100 µm, 200 µm, or 500 µm. A composite film and a freestanding film may have a thickness of 10 µm or less, the thickness is not limited thereto.

In an embodiment of the present invention, a hybrid membrane is used as a separation membrane and can separate one or more gases from a mixed gas including two or more gases. For instance, the gases can be separated from each other using a molecular size difference between gases included in the mixed gas by passing the mixed gas through a hybrid membrane.

In an embodiment of the present invention, although a hybrid membrane may be formed by using AZIF nanoparticles only as nanoparticles, the nanoparticles are not limited to the AZIF nanoparticles. For example, the nanoparticles may include a mixture of the AZIF nanoparticles and ZIF nanoparticles, and may include two types or more of the AZIF nanoparticles.

In an embodiment of the present invention, although a molecular size difference between gases included in the mixed gas may be about 0.1 Å to about 5 Å, the molecular size difference is not limited thereto.

In an embodiment of the present invention, although the mixed gas may include a gas set selected from the group of gas sets consisting of $C_3H_6/C_3H_8$, $C_2H_4/C_2H_6$, $CO_2/CH_4$, $CO_2/CO$, $CO_2/N_2$, $N_2/CH_4$, n-$C_4$/i-$C_4$ (n-butane/iso-butane) as well as $H_2/CH_4$, $H_2/C_3H_6$, and $H_2/C_3H_8$, the mixed gas is not limited thereto.

In an embodiment of the present invention, AZIF nanoparticles included in the hybrid membrane have improved separation selectivity within the gas sets of $C_3H_6/C_3H_8$, $C_2H_4/C_2H_6$, $CO_2/CH_4$, $CO_2/CO$, $CO_2/N_2$, $N_2/CH_4$ and n-$C_4$/i-$C_4$ (n-butane/iso-butane) as well as $H_2/CH_4$, $H_2/C_3H_6$, and $H_2/C_3H_8$.

In an embodiment of the present invention, although the AZIF nanoparticles may have improved $C_3H_6$ permeability and $C_3H_6/C_3H_8$ selectivity with respect to $C_3H_6/C_3H_8$ gases, the AZIF nanoparticles are not limited thereto.

In an embodiment of the present invention, although a permeability of the hybrid membrane with respect to the $C_3H_6$ gas may be about 1 Barrer or more, the permeability is not limited thereto. For example, although the permeability of the hybrid membrane with respect to the $C_3H_6$ gas may be about 1 Barrer or more, about 10 Barrer or more, about 20 Barrer or more, about 30 Barrer or more, about 40 Barrer or more, or about 50 Barrer or more, the permeability is not limited thereto.

In other embodiment of the present invention, although a permeability of the hybrid membrane with respect to the $C_3H_6$ gas may be about 10 Barrer to about 100 Barrer, the permeability is not limited thereto. For example, although the permeability of the hybrid membrane with respect to the $C_3H_6$ gas may be about 10 Barrer to about 100 Barrer, about 10 Barrer to about 80 Barrer, about 10 Barrer to about 60 Barrer, about 10 Barrer to about 40 Barrer, about 10 Barrer to about 20 Barrer, about 30 Barrer to about 100 Barrer, about 50 Barrer to about 100 Barrer, about 70 Barrer to about 100 Barrer, or about 90 Barrer to about 100 Barrer, the permeability is not limited thereto.

In an embodiment of the present invention, although a selectivity of the hybrid membrane with respect to $C_3H_6/C_3H_8$ gases may be about 1 or more, the selectivity is not limited thereto. For example, although a selectivity of the hybrid membrane with respect to $C_3H_6/C_3H_8$ gases may be about 1 or more, about 10 or more, about 20 or more, about 30 or more, about 40 or more, or about 50 or more, the selectivity is not limited thereto.

In other embodiment of the present invention, although a separation selectivity of the hybrid membrane with respect to $C_3H_6/C_3H_8$ gases may be about 10 to about 100, the separation selectivity is not limited thereto. For example, although a separation selectivity of the hybrid membrane with respect to $C_3H_6/C_3H_8$ gases may be about 10 to about 100, about 10 to about 80, about 10 to about 60, about 10 to about 40, about 10 to about 20, about 30 to about 100, about 50 to about 100, about 70 to about 100, or about 90 to about 100, the separation selectivity is not limited thereto.

AZIF-67 nanoparticles may have a permeability with respect to $C_3H_8$ of 200 to 400 Barrer and a $C_3H_6/C_3H_8$ selectivity of 270 to 400 at 35° C. AZIF-8 nanoparticles may have a permeability with respect to $C_3H_8$ of 300 to 600 Barrer and a $C_3H_6/C_3H_8$ selectivity of 140 to 300 at 35° C.

A hybrid membrane comprising AZIF-8 nanoparticles may have a permeability with respect to $C_3H_8$ of 40 to 50 Barrer, 40 to 80 Barrer, or 70 to 80 Barrer and a $C_3H_6/C_3H_8$ selectivity of 22 to 30, 22 to 40, or 30 to 40 at 35° C. Particularly, when a hybrid membrane comprises 40 wt % or more of AZIF-8 nanoparticles, the hybrid membrane may have a permeability with respect to $C_3H_8$ of 70 to 80 Barrer and a $C_3H_6/C_3H_8$ selectivity of 30 to 40.

A hybrid membrane comprising AZIF-67 nanoparticles may have a permeability with respect to $C_3H_8$ of 40 to 50 Barrer, 40 to 70 Barrer, or 60 to 80 Barrer and a $C_3H_6/C_3H_8$ selectivity of 33 to 40, 33 to 60, or 50 to 60 at 35° C. Particularly, when a hybrid membrane comprises 40 wt % or more of AZIF-67 nanoparticles, the hybrid membrane may have a $C_3H_6/C_3H_8$ selectivity of 50 to 60.

A hybrid membrane comprising AZIF-67 nanoparticles may have a $C_3H_6/C_3H_8$ energetic selectivity of 1,000 to 5,000, or 1,000 to 10,000.

Figure 12:
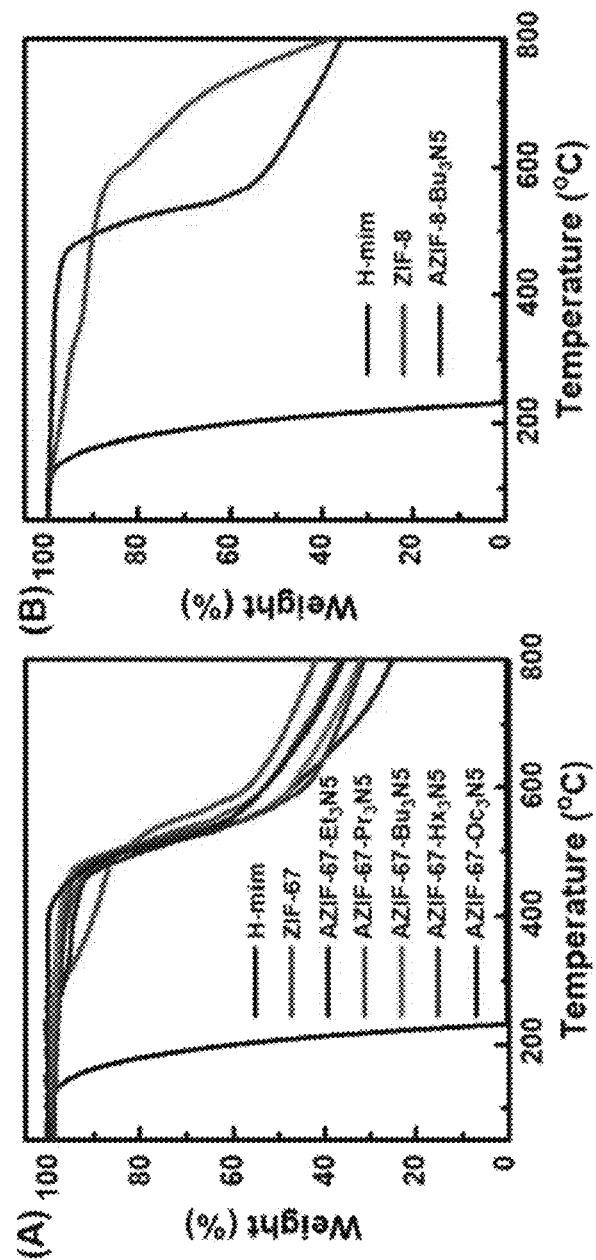
FIG. 12 is thermogravimetric analysis (TGA) results of AZIF-67 nanoparticles and AZIF-8 nanoparticles into which various alkylamines are introduced in an embodiment of the present invention.
Figure 13:
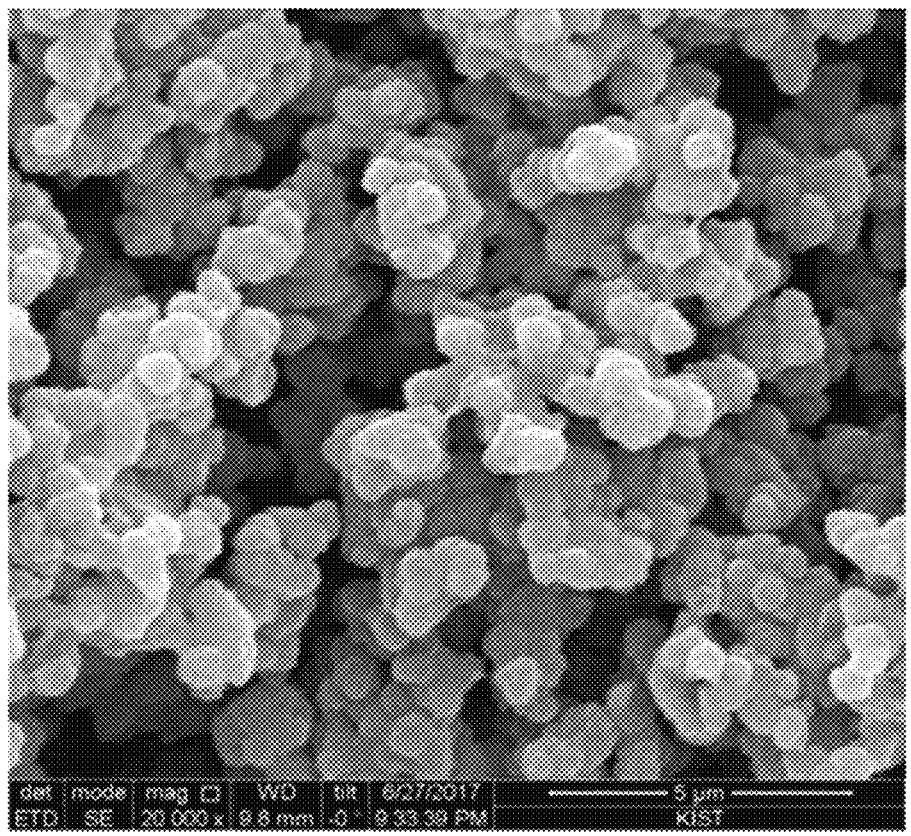
FIG. 13 is an image obtained by analyzing by a scanning electron microscope (SEM) a phenomenon that the particles are agglomerated to form a chunk when an alkylamine group is introduced into a reaction solution of AZIF-67 nanoparticles in an embodiment of the present invention.

In an embodiment of the present invention, AZIF nanoparticles have characteristics of high purity. A purity of the AZIF nanoparticles may be 99% or more, or 99.5% or more, the purity is not limited thereto. For instance, an organic ligand, i.e., an unreacted material which may be an impurity is dissolved at low temperatures, while AZIF nanoparticles are thermally stable up to about 400° C. (FIG. 12). When comparing thermogravimetric analysis (TGA) graphs of AZIF nanoparticles and ZIF nanoparticles, there is not a weight change up to a high temperature of more than 400° C. in case of AZIF nanoparticles while a weight change occurs from a temperature of less than 300° C. in case of ZIP-67 nanoparticles and ZIF-8 nanoparticles, and a weight change occurs from about 180° C., i.e., a decomposition temperature of the organic ligand particularly in case of ZIF-8 nanoparticles. Therefore, it is confirmed that AZIF-67 nanoparticles and AZIF-8 nanoparticles that have been developed accordingly have relatively high purity values (FIG. 12).

AZIF nanoparticles may exhibit a mass decrease of 3% or less, specifically a mass decrease of 0.01 to 3%, 0.01 to 2%, or 0.1 to 2% at 400° C. in TGA test of the present invention.

In a second aspect of the present invention, a method for producing AZIF nanoparticles is provided. The method comprises heating a precursor solution including a metal precursor, an imidazole-based ligand compound and a first polar solvent under stirring, adding an organic base solution to the precursor solution heated under stirring to obtain a suspension comprising a micro-sized chunk including the crystal structure-adjusted zeolitic imidazolate framework, adding a second polar solvent to the suspension heated under stirring to dilute the suspension, and filtering the diluted suspension to obtain nanoparticles including the zeolitic imidazolate framework.

In order to produce AZIF nanoparticles according to an embodiment of the present invention, a precursor solution including a metal precursor, an imidazole-based ligand compound and a first polar solvent is first heated under stirring.

A method for producing AZIF nanoparticles according to an embodiment of the present invention differently from a method for synthesizing ZIF nanoparticles comprises simultaneously injecting the metal precursor and the imidazole-based ligand compound to dissolve the metal precursor along with the imidazole-based ligand compound, or separately dissolving the metal precursor and the imidazole-based ligand compound to mix the separately dissolved metal precursor and imidazole-based ligand compound.

In an embodiment of the present invention, although the metal precursor may include an acetate-based metal salt, the metal precursor is not limited thereto. For example, although the metal precursor may include a cobalt (Co) acetate tetrahydrate metal salt, a zinc (Zn) acetate dihydrate metal salt, etc., the metal precursor is not limited thereto.

In an embodiment of the present invention, although the metal precursor may include an acetate salt of one or more metals selected from the group consisting of Co, Zn, Sc, Ti, V, Cr, Mn, Fe, Ni, Cu, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub, the metal precursor is not limited thereto.

In an embodiment of the present invention, although the imidazole-based ligand compound may comprise one or more selected from imidazole-based compounds represented by the following chemical formula 1 or chemical formula 2, the imidazole-based ligand compound is not limited thereto:

[Chemical formula 1]

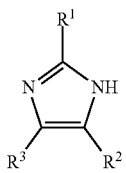

[Chemical formula 2]

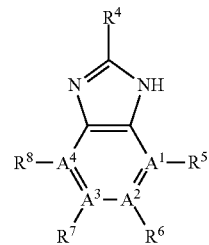

In each of chemical formula 1 and chemical formula 2, $R^1$, $R^2$, $R^3$, $R^4$, $R^5$, $R^6$, $R^7$ and Fe are each independently H, a $C_1$-$C_{10}$ linear or branched alkyl, halogen, hydroxy, cyano, nitro or aldehyde group; and $A^1$, $A^2$, $A^3$ and $A^4$ are each independently C or N, provided that $R^5$, $R^6$, $R^7$ and Fe exist only when $A^1$ and $A^4$ are C.

In an embodiment of the present invention, although a molar ratio of the metal precursor to the imidazole-based ligand compound may be about 1:1 to about 1:10, or 1:2, the molar ratio is not limited thereto. For example, although a molar ratio of the metal precursor to the imidazole-based ligand compound may be about 1:1 to about 1:10, about 1:1 to about 1:8, about 1:1 to about 1:6, about 1:1 to about 1:4, about 1:1 to about 1:2, about 1:2 to about 1:10, about 1:2 to about 1:8, about 1:2 to about 1:6, about 1:2 to about 1:4, or about 1:1 to about 1:2, the molar ratio is not limited thereto.

In an embodiment of the present invention, although a first polar solvent may include one or more selected from the group consisting of alcohol, ethylene glycol, water, dimethylformamide, dimethyl sulfoxide, acetonitrile, and dimethylacetamide, the first polar solvent is not limited thereto. As the first polar solvent, solvent which can cause a dehydrogenation reaction in a ligand used due to a high basicity cannot be used.

In an embodiment of the present invention, although a concentration of a metal precursor in a precursor solution may be about 0.01 M to about 0.4 M, the concentration is not limited thereto. For example, although a concentration of the metal precursor in the precursor solution may be about 0.01 M to about 0.4 M, 0.01 M to about 0.3 M, 0.01 M to about 0.2 M, 0.01 M to about 0.1 M, 0.01 M to about 0.05 M, 0.05 M to about 0.4 M, 0.08 M to about 0.4 M, 0.08 M to about 0.3 M, 0.08 M to about 0.2 M, 0.1 M to about 0.4 M, 0.1 M to about 0.3 M, or 0.1 M to about 0.2 M, the concentration is not limited thereto.

In an embodiment of the present invention, although a heating temperature of the precursor solution may be in a range of about 30° C. to about 90° C., the heating temperature is not limited thereto. For example, although a heating temperature of the precursor solution may be in a range of about 30° C. to about 80° C., 30° C. to about 70° C., 30° C. to about 65° C., 30° C. to about 60° C., or 30° C. to about 50° C., the heating temperature is not limited thereto.

In an embodiment of the present invention, although a heating temperature of the precursor solution may be held isothermally, the heating temperature is not limited thereto. The precursor solution, as a solution of a transparent state, may be a state that crystalline ZIF nanoparticles are not formed. At this time, the precursor solution exists as a state that one of metal (M) salts of the metal precursor is combined with a ligand (L) of the imidazole-based ligand compound, and has a structure as in the following chemical formula 4. As represented in the following chemical formula 4, a basic structure is L-M-L, and amine of the ligand is a state that it is difficult to combine with one or more metal ions as a state that dehydrogenation has been hardly progressed yet. However, the precursor solution is a precursor aggregate of small units to an extent that the ZIF nanoparticles cannot be defined as a crystalline material by their size although ZIF nanoparticles have been formed by progressing dehydrogenation of amine of the imidazole-based ligand compound. When the heating temperature is not isothermal, there may be a constitutional difference generated between obtained ZIF nanoparticles, uniformity of particle sizes of the ZIF nanoparticles is lowered, and a precipitate is found in the precursor solution, or the precursor solution becomes an opaque state accordingly. That is, a reduced metal is generated, or ZIF nanoparticles have already been produced to generate differences in sizes, compositions, and others of AZIF nanoparticles obtained in the final step.

obtained by dividing a change according to a trend in reaction temperature changes according to time in synthesis of AZIF-67-Bu$_3$N$_5$ nanoparticles into total four steps of S1 to S4, and diluted solutions obtained by diluting each of the solutions in NMP by dynamic light scattering (DLS) spectroscopy. According to results of DLS analysis, nanoparticles have not been detected in the steps S1 and S2.

Referring to FIG. 1, the solutions have a transparent pink color, i.e., an initial color of the solutions before injecting an organic base solution, while color of the solutions is changed into a purple color after injecting the organic base solution.

As DLS analysis results of the solutions obtained in the total four steps, AZIF-67 nanoparticles have not been synthesized in the S1 and S2 steps having pink color solutions, while nanoparticles are synthesized from the S3 step, i.e., a step of injecting the organic base solution.

As illustrated in chemical formula 5, a coupling structure of synthesized nanoparticles has a basic structure of L-M-L, becomes a state that amine of the ligand can be combined with other metal precursor as a state that dehydrogenation has been progressed, and may additionally have a structure in which an alkylamine as a second organic ligand is included.

[Chemical formula 4]

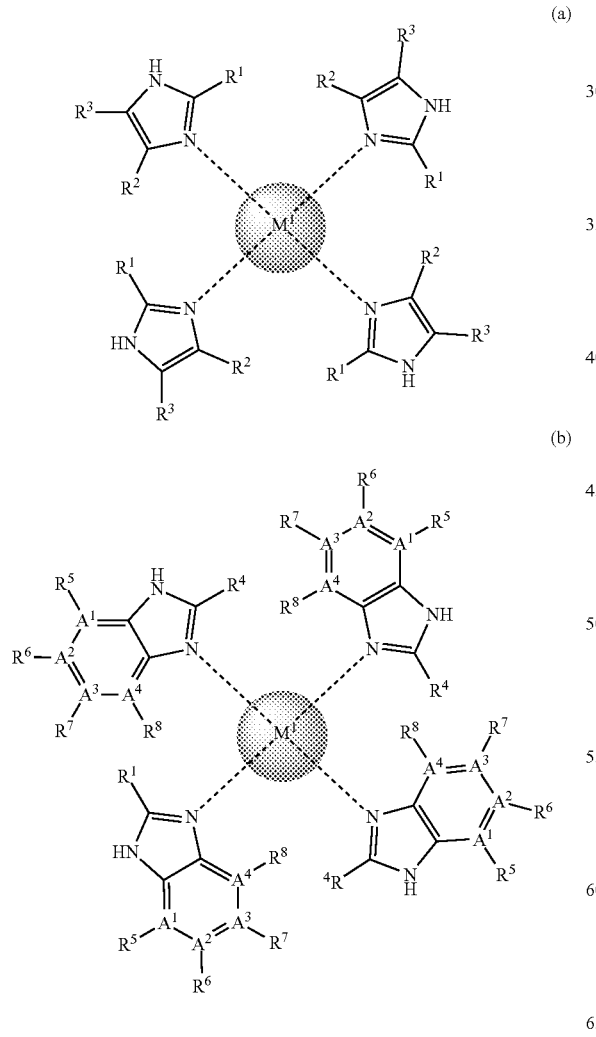

[Chemical formula 5]

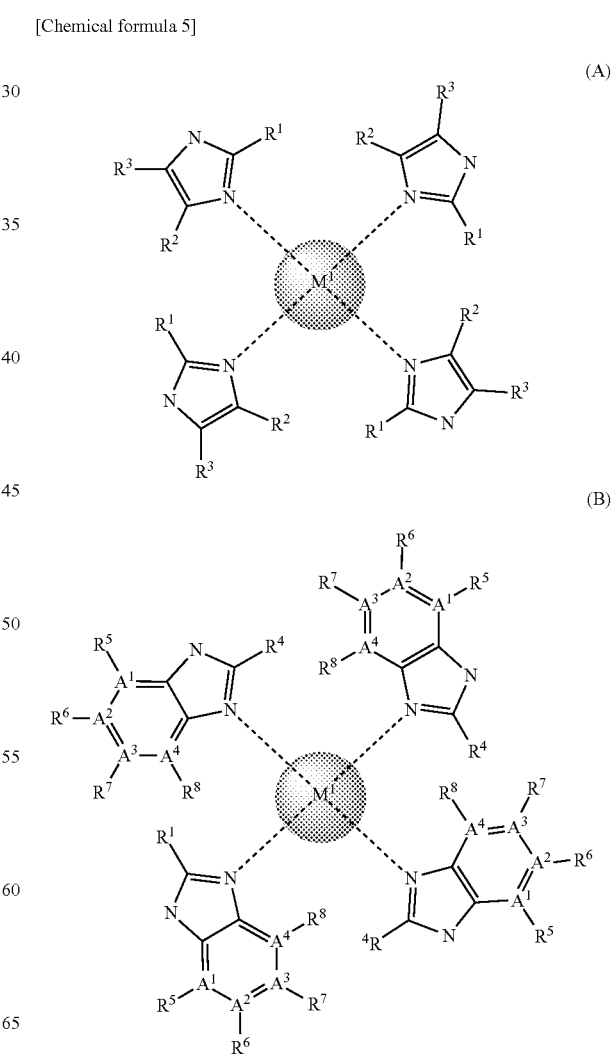

FIG. 1 is data according to Example 1 of the present invention. FIG. 1 is results of analyzing colors of solutions -continued

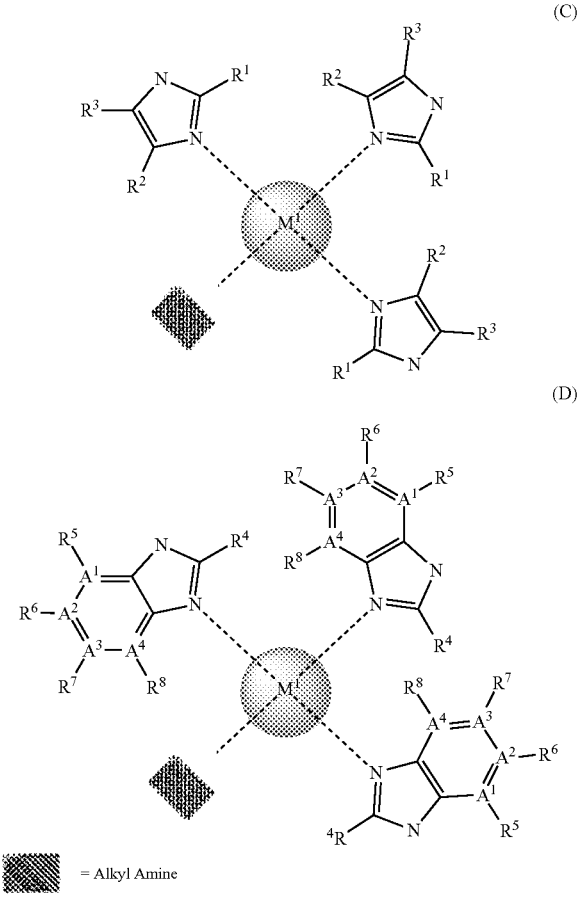

(C)

(D)

= Alkyl Amine

ZIF-67 nanoparticles synthesized in the step S3 have two types of a particle size group of about up to 30 nm and about up to 2 μm.

Figure 6:
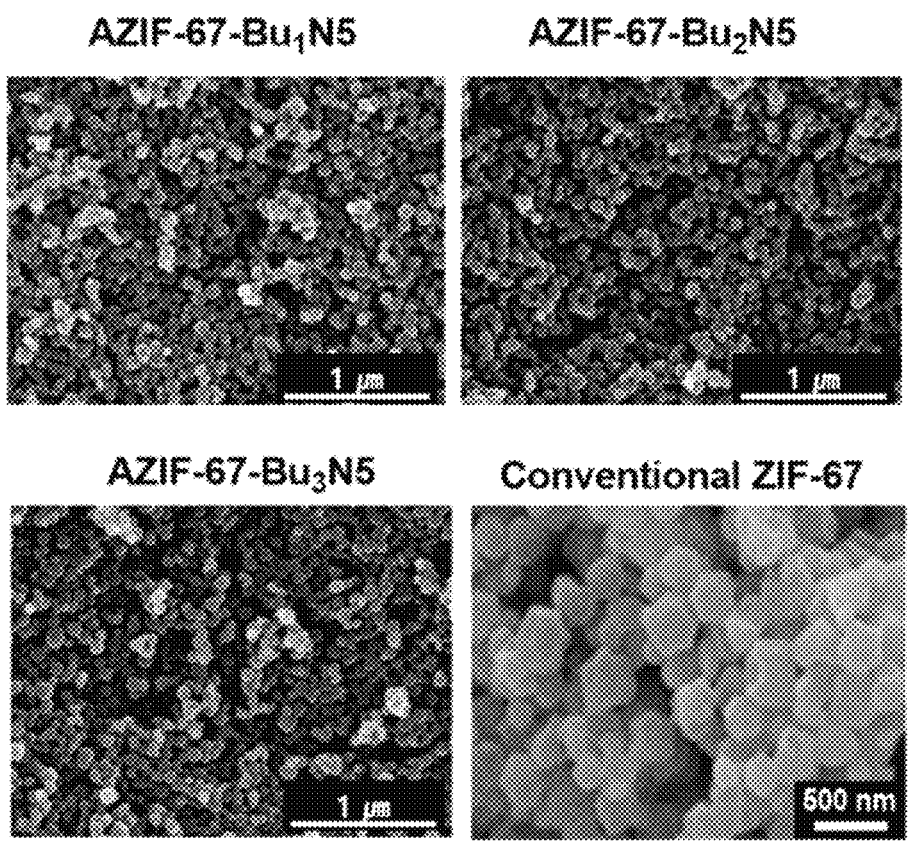
FIG. 6 is scanning electron microscope (SEM) images illustrating AZIF-67 nanoparticles into which various alkylamines are introduced synthesized according to an embodiment of the present invention and general ZIF-67 nanoparticles.

FIG. 6 and FIG. 11 are SEM images obtained after performing a simple sonication treatment process before purifying samples corresponding to the step S4 in FIG. 1 and SEM images obtained by well dispersing the purified samples in NMP after purifying the samples. Referring to FIG. 6 and FIG. 11, initially synthesized AZIF-67 nanoparticles exist in the form of a micro-sized chunk, and the AZIF-67 nanoparticles may be dispersed in a nanoparticle size when dispersing the purified AZIF-67 nanoparticles in NMP after purifying the AZIF-67 nanoparticles.

In an embodiment of the present invention, although a stirring time of the organic precursor solution may be about 10 minutes to about 36 hours, the stirring time is not limited thereto. For example, although a stirring time of the organic precursor solution may be about 10 minutes to about 36 hours, 10 minutes to about 24 hours, 10 minutes to about 12 hours, 10 minutes to about 6 hours, 10 minutes to about 1 hour, 10 minutes to about 30 minutes, 30 minutes to about 36 hours, 1 hour to about 36 hours, 12 hours to about 36 hours, or 24 hours to about 36 hours, the stirring time is not limited thereto. AZIF nanoparticles including a reduced metal may be produced since the metal salt is reduced when the stirring time exceeds about 36 hours, and the stirring time may be decreased or increased when temperature of the organic precursor solution is deviated from an appropriate temperature range.

Subsequently, a suspension including a micro-sized chuck is obtained by adding an organic base solution to the precursor solution heated under stirring.

The organic base solution may be added for an addition time of 5 seconds to 5 minutes, or within 30 seconds. When the addition time of the organic base solution exceeds about 5 minutes, the organic base solution may affect composition and performance of a final product, and may have an effect of reducing yield of AZIF nanoparticles. Further, in an addition rate of the organic base solution, it is preferable to consistently add a predetermined amount of the organic base solution if possible.

In an embodiment of the present invention, although a micro-sized chunk including the zeolitic imidazolate framework may have a size of about 1 μm to about 10 μm, the size of the micro-sized chunk is not limited thereto. For example, although a micro-sized chunk including the zeolitic imidazolate framework may have a size of about 1 μm to about 10 μm, about 1 μm to about 9 μm, about 1 μm to about 8 μm, about 1 μm to about 7 μm, about 1 μm to about 6 μm, about 1 μm to about 5 μm, about 1 μm to about 4 μm, about 1 μm to about 3 μm, about 1 μm to about 2 μm, about 2 μm to about 10 μm, about 3 μm to about 10 μm, about 4 μm to about 10 μm, about 5 μm to about 10 μm, about 6 μm to about 10 μm, about 7 μm to about 10 μm, about 8 μm to about 10 μm, about 9 μm to about 10 μm, about 2 μm to about 9 μm, about 3 μm to about 8 μm, about 4 μm to about 7 μm, or about 5 μm to about 6 μm, the size of the micro-sized chunk is not limited thereto.

In an embodiment of the present invention, the organic base solution may comprise one or more organic bases selected from the group consisting of a primary amine, a secondary amine, and a tertiary amine.

In an embodiment of the present invention, the primary amine, the secondary amine, and the tertiary amine may be each independently an amine compound represented by the following chemical formula 3:

[Chemical formula 3]

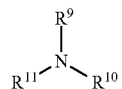

In chemical formula 3, $R^9$, $R^{10}$ and $R^{11}$ are each independently H, or a $C_1$-$C_{18}$ linear or branched alkyl group.

In an embodiment of the present invention, the organic base solution may have a pKa value of about more than 7. For example, the organic base solution may have a pKa value of about more than 7, about 7.5 or more, about 7.8 or more, about 8 or more, about 9 or more, about 10 or more, about 11 or more, about 12 or more, about 13 or more, or about 14 or more. Further, for example, the organic base solution may have a pKa value of 7 to 10, 7 to 12, or 7 to 14. When the organic base solution has a pKa value of 7 or less, crystalline AZIF nanoparticles are not formed, or yield of the crystalline AZIF nanoparticles is greatly reduced.

Further, the suspension is diluted by adding a second polar solvent to the suspension heated under stirring.

In an embodiment of the present invention, the second polar solvent is preferably a solvent having a pH value of more than 5 and a good solubility in the metal salt and ligand used in the reaction. The second polar solvent may have a pH value of 5 to 7, 5 to 9, or 5 to 11. For example, although the second polar solvent may include one or more selected from the group consisting of alcohol, methanol, ethanol, propanol, ethylene glycol, water, dimethylformamide, dimethyl sulfoxide, acetonitrile, and dimethylacetamide, the second polar solvent is not limited thereto. When the second polar solvent has a pH value of 5 or less, zeolitic imidazolate framework of nanoparticles to be synthesized may be destroyed. Further, it is preferably that the second polar solvent has good solubility with respect to an unreacted reactant, i.e., a metal precursor, a ligand, or the like.

Further, after diluting a suspension, a diluted suspension may be stirred for an additional stirring time of about 1 minute to about 10 minutes. When the diluted suspension is stirred for an additional stirring time of more than 10 minutes, it may be difficult to apply the diluted suspension to a purification process through a filter, or yield of AZIF nanoparticles may be greatly reduced since the size of the micro-sized chunk is reduced. However, the additional stirring time is not limited thereto. Finally, AZIF nanoparticles are obtained by filtering the diluted suspension.

In an embodiment of the present invention, a vacuum filter as a filter may be used during a filtering process. Although types of the filter may include paper, metal, glass, plastics, ceramics, etc., the types of the filter are not limited thereto, provided that it is inappropriate to use paper or Teflon-based filter paper when using water as a solvent, and it is also impossible to use plastics when using a solvent capable of dissolving plastics as the solvent.

In an embodiment of the present invention, a pore size of the filter may be about 1 μm to about 8 μm. For example, although a pore size of the filter may be about 1 μm to about 8 μm, 1 μm to about 7 μm, 1 μm to about 6 μm, 1 μm to about 5 μm, 1 μm to about 4 μm, 1 μm to about 3 μm, or 1 μm to about 2 μm, the pore size is not limited thereto. A time taken for performing a filtering process may be considerably lengthened when a pore size of the filter is less than about 1 μm, while the filtering process may not be performed, or yield may be remarkably reduced when the pore size of the filter is about 8 μm or more.

Although a method for producing AZIF nanoparticles according to an embodiment of the present invention may further comprise stirring the diluted suspension for a time of about 10 minutes or less before performing the filtering process, or stopping an operation without performing a stirring process, the method is not limited thereto.

A method for producing AZIF nanoparticles according to an embodiment of the present invention may further comprise drying the obtained AZIF nanoparticles.

In an embodiment of the present invention, the drying process may be performed at a drying temperature of about 30° C. to about 110° C. Although the drying temperature is most preferably about 80° C., the drying temperature is not limited thereto. For example, Although the drying temperature may be about 30° C. to about 110° C., about 40° C. to about 100° C., about 50° C. to about 90° C., about 60° C. to about 80° C., about 70° C. to about 80° C., about 80° C. to about 90° C., or about 70° C. to about 90° C., the drying temperature is not limited thereto.

A method for producing AZIF nanoparticles according to an embodiment of the present invention enables mass synthesis by showing a high yield. Here, the high yield means that a weight ratio of AZIF nanoparticles obtained based on the weight of a metal and a ligand precursor included in an AZIF structure is higher than about 80%. Nanoparticles including the ZIF structure may be obtained at a ratio of about 30% to about 97% according to an addition ratio of the organic base solution. Although yield of the obtained AZIF nanoparticles is preferably about 85% to about 95%, the yield is not limited thereto.

Hereinafter, the present invention will be described in more detail with reference to Examples. However, the present is not limited thereto. The above-described experimental data are obtained by testing samples obtained from Examples below.

Example 1

After injecting 39.55 g of 2-methylimidazole and 60 g of cobalt(II) acetate tetrahydrate into a 3L RB flask and injecting 1,416.8 mL of methanol into the flask, 2-methylimidazole and cobalt(II) acetate tetrahydrate were well dissolved in methanol by performing a stirring process for 10 minutes. The stirring process was performed for 10 minutes in a state that the dissolved solution is maintained at an isothermal temperature of 60° C. using a heating mantle. Thereafter, 286.2 mL of tributylamine (Bu2N) was rapidly injected at a strong stirring state, and the stirring process was maintained for 1 minute. Thereafter, 1 L of methanol was additionally injected, the stirring process was additionally progressed for 1 minute, and then the stirring process was stopped. A filtering process was progressed using a cellulose filter paper, and a filtered solid material was purified by additionally using 1.5 L of methanol. A solid material obtained after performing a purification process was injected into an 80° C. vacuum oven, and the solid material was dried for 24 hours to obtain ZIF-67-Bu$_3$N$_5$ nanoparticles. The obtained ZIF-67-Bu$_3$N$_5$ nanoparticles had a weight of 51.5 g, and exhibited a synthesis yield corresponding to about a 95.7% extent compared to a weight of 53.8 g introduced in synthesis of Co$^{2+}$ and 2-methylimidazole, i.e., constituent elements of ZIF-67 nanoparticles.

Example 2

ZIF-67 nanoparticles including Bu$_2$N (AZIF-67-Bu$_2$N$_5$ nanoparticles) were obtained at a molar ratio of metal:ligand:base=1:2:5 by the same method as Example 1 except that butylamine(Bu$_2$N), i.e., other organic base was used.

Example 3

ZIF-67 nanoparticles including Bu$_1$N (AZIF-67-Bu$_1$N$_5$ nanoparticles) were obtained at a molar ratio of metal:ligand:base=1:2:5 by the same method as Example 1 except that butylamine(Bu$_1$N), i.e., other organic base was used.

In addition, various AZIF-67 nanoparticles and AZIF-8 nanoparticles were obtained by the same method as the above Examples while changing types and use amounts of alkylamine.

Figure 14:
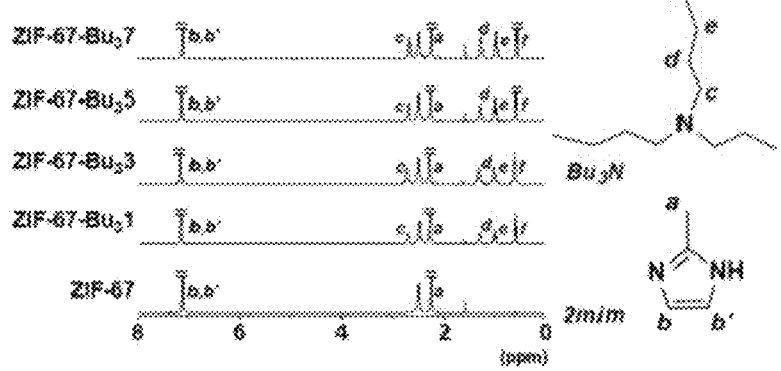
FIG. 14 is $^1H$ NMR spectra obtained by dissolving with acid AZIF-67 nanoparticles into which various amounts and types of butylamines are introduced synthesized according to an embodiment of the present invention.
Figure 14:
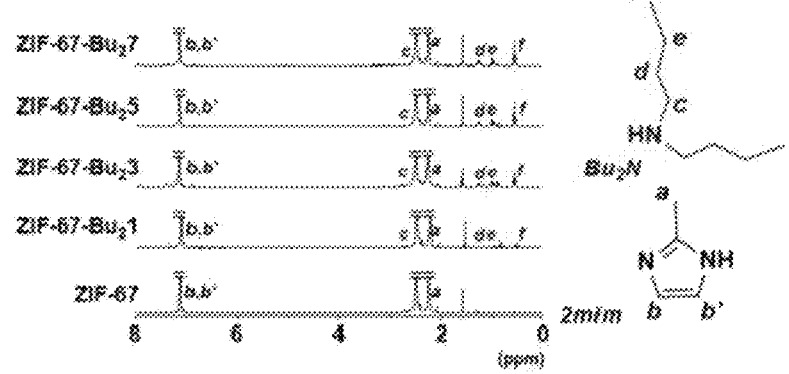
Figure 14:
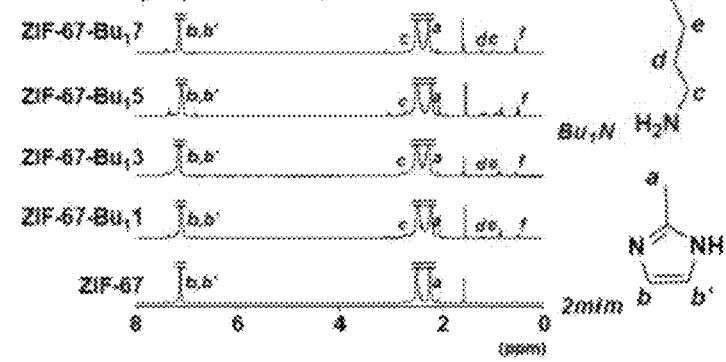

FIG. 14 is $^1$H NMR analysis results obtained by collapsing a crystal structure using acid after synthesizing AZIF nanoparticles prepared in Examples. Structures of 2-methylimidazole and an organic base, i.e., constituent elements along with analyzed $^1$H NMR spectra are indicated in FIG. 14. Further, chemical structures corresponding to respective peaks are indicated in FIG. 14. It could be confirmed through $^1$H NMR analysis that the organic base was included in AZIF-67 structure, and it could be confirmed that an introduction amount of the organic base could be adjusted through a phenomenon that a peak size of an organic base observed was increased according to an amount of the organic base applied during synthesis.

Molar ratios of AZIF-67 nanoparticles synthesized through the above Examples to reactants introduced during synthesis, and ratios of the ligands to the organic bases in the obtained nanoparticles are arranged in the following Table 1.

Particularly, it has been confirmed that a ratio of the introduced $Bu_3N$ does not show a large difference although the improved molar ratio is applied as a molar ratio of $Bu_3N$ introduced from $Bu_3N$-introduced AZIF-67 nanoparticles is greatly increased from 5 to 10 compared to a cobalt precursor.

TABLE 1

|  | $Co:2mim:Bu_1N$ | $2mim/Bu_1N$ (wt %) |
|---|---|---|
| $AZIF-67-Bu_1N_1$ | 1:2:1 | 98.9/1.1 |
| $AZIF-67-Bu_1N_2$ | 1:2:2 | 97.9/2.1 |
| $AZIF-67-Bu_1N_3$ | 1:2:3 | 97.0/3.0 |
| $AZIF-67-Bu_1N_5$ | 1:2:5 | 95.6/4.4 |
|  | $Co:2mim:Bu_2N$ | $2mim/Bu_2N$ (wt %) |
| $AZIF-67-Bu_2N_1$ | 1:2:1 | 98.8/1.2 |
| $AZIF-67-Bu_2N_2$ | 1:2:2 | 97.2/2.8 |
| $AZIF-67-Bu_2N_3$ | 1:2:3 | 95.2/4.8 |
| $AZIF-67-Bu_2N_5$ | 1:2:5 | 93.5/6.5 |
|  | $Co:2mim:Bu_3N$ | $2mim/Bu_3N$ (wt %) |
| $AZIF-67-Bu_3N_1$ | 1:2:1 | 91.6/8.4 |
| $AZIF-67-Bu_3N_2$ | 1:2:2 | 85.8/14.2 |
| $AZIF-67-Bu_3N_3$ | 1:2:3 | 84.7/15.3 |
| $AZIF-67-Bu_3N_5$ | 1:2:5 | 81.6/18.4 |
| $AZIF-67-Bu_3N_5$(Scale-up) | 1:2:5 | 81.6/18.4 |
| $AZIF-67-Bu_3N_{10}$ | 1:2:10 | 80.3/19.7 |

Example 4

Figure 15:
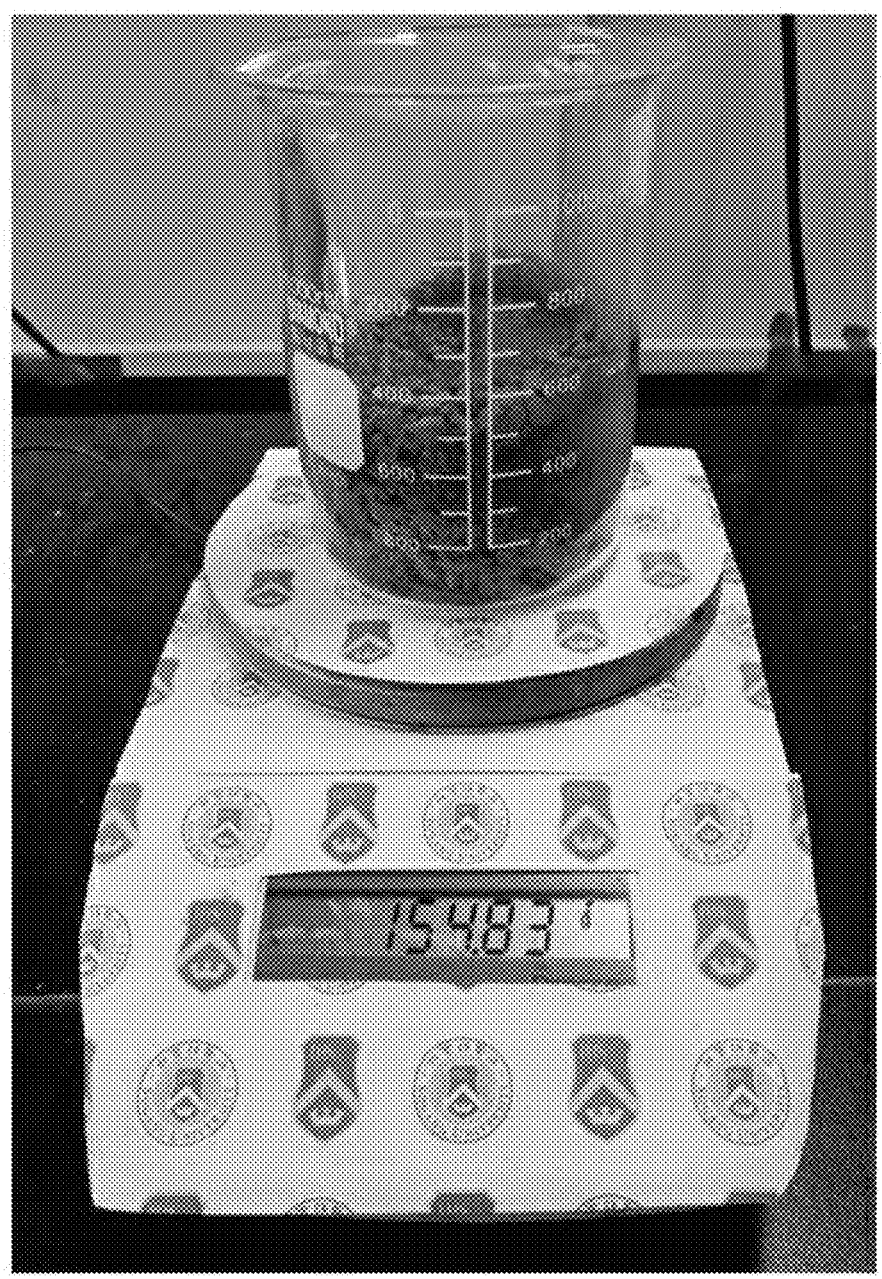
FIG. 15 is a photograph showing AZIF-67-$Bu_3N_5$ nanoparticles obtained at one go through a large capacity reaction in an embodiment of the present invention.

ZIF-67 nanoparticles ($AZIF-67-Bu_3N_5$) including $Bu_3N$ was obtained using the same method and molar ratio (metal:ligand:base=1:2:5) as in Example 1 and using 180 g of applied cobalt(II) acetate tetrahydrate. A finally obtained amount of nanoparticles was 155 g and exhibited a yield of 96.2% compared to 161.1 g, a weight of 100% to which cobalt ions and 2-methylimidazole were applied (FIG. 15).

Further, it could be confirmed that reproducibility was high by exhibiting almost the same ratio as $AZIF-67-Bu_3N$ nanoparticles synthesized at a low scale in which a weight ratio of 2 min/$Bu_3N$ represented in Table 1 was 81.6/18.4 (Table 1).

Example 5

Synthesized nanoparticles ($AZIF-67-Et_3NX$, X=1, 3, 5. 7. 9) were obtained by changing a molar ratio of $Et_3N$ from 1 to 9 in ZIF-67 nanoparticles including $Et_3N$ by the same method as in Example 1 using triethylamine ($Et_3N$), i.e., other organic base.

Figure 16:
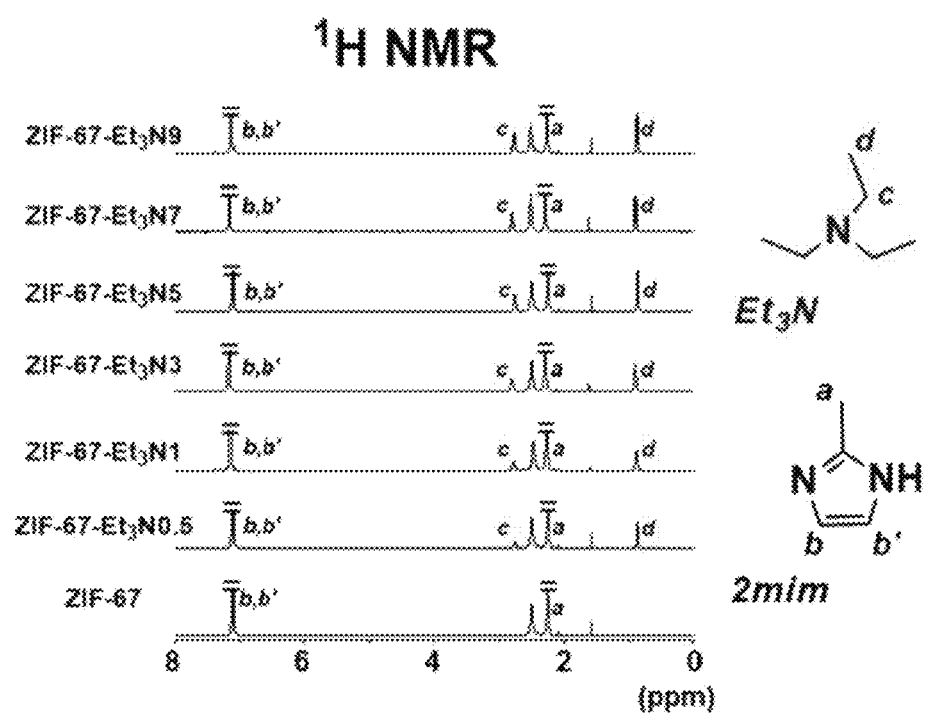
FIG. 16 is $^1H$ NMR spectra obtained by dissolving with acid the AZIF-67 nanoparticles acquired according to an amount of tributylamine introduced into a reaction when synthesizing AZIF-67 nanoparticles in an embodiment of the present invention.

It was confirmed through analysis of $^1H$ NMR results in FIG. 16 that the synthesized $AZIF-67-Et_3NX$ nanoparticles include $Et_3N$. Further, it could be confirmed through an increase in $Et_3N$ $^1H$ NMR peak that the more a ratio of $Et_3N$ applied to synthesis is increased, the more an introduction amount of $Et_3N$ is increased. Further, XRD analysis was progressed to confirm crystal structure of $AZIF-67-Et_3N_5$ nanoparticles, and XRD analysis results are in FIG. 4. The $AZIF-67-Et_3N_5$ nanoparticles exhibited a crystal structural change with a trend similar to that of $AZIF-67-Bu_3N_5$nanoparticles synthesized by Example 1 when comparing with general ZIF-67 nanoparticles.

Example 6

AZIF-8 nanoparticles was obtained using the same method and molar ratio (metal:ligand:base=1:2:5) as in Example 1 and using zinc(II) acetate dihydrate, i.e., other metal precursor.

Figure 17:
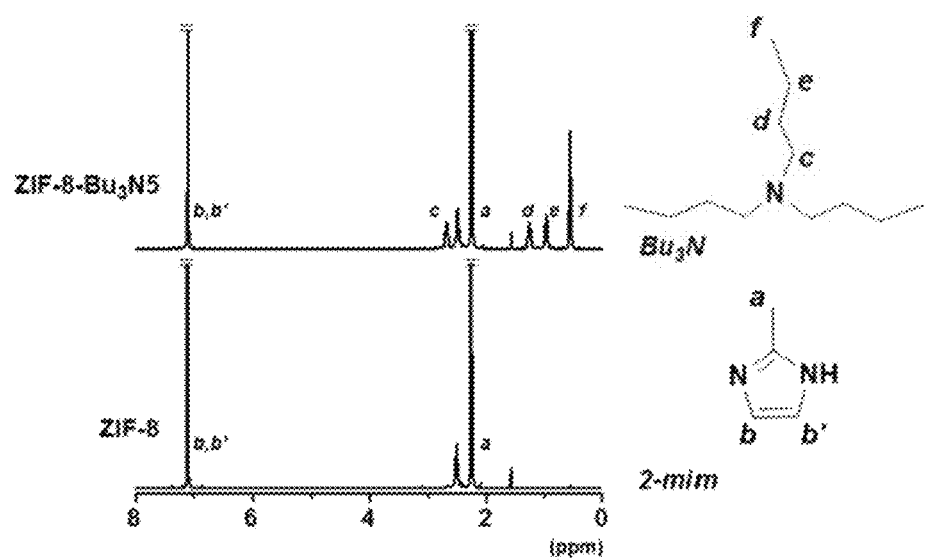
FIG. 17 is $^1H$ NMR spectra obtained by dissolving AZIF-8-$Bu_3N_5$ nanoparticles with acid in an embodiment of the present invention.

It was confirmed that $AZIF-8-Bu_3N_5$ nanoparticles include $Bu_3N$ by analyzing XRD and $^1H$ NMR results of synthesized $AZIF-8-Bu_3N_5$ nanoparticles as in FIG. 5 and FIG. 17, and it was confirmed that the $AZIF-8-Bu_3N_5$ nanoparticles exhibit a crystal structural change similar to that of $AZIF-67-Bu_3N_5$ nanoparticles obtained in Example 1 when comparing with a crystal structure of general ZIF-8 nanoparticles.

Membrane-Example 1

In order to produce a hybrid membrane with AZIF-67 nanoparticle contents different from each other, $AZIF-67-Bu_3N_5$ nanoparticles were mixed with NMP in a glass container, and the $AZIF-67-Bu_3N_5$ nanoparticles were uniformly dispersed in a solvent through an ultrasonic pulverizer for 30 minutes. The $AZIF-67-Bu_3N_5$ nanoparticles were uniformly dispersed in the solvent for 2 minutes using a horn-shaped ultrasonic pulverizer. After mixing a 6FDA-DAM polymer with a solvent having the $AZIF-67-Bu_3N_5$ nanoparticles uniformly dispersed therein to obtain a mixture, stirring the mixture through a roller for 12 hours to obtain a uniformly dissolved polymer solution, injecting a glass bottle containing the uniformly dissolved polymer solution into the ultrasonic pulverizer for 30 minutes to remove microbubbles in the solution, and spreading the polymer solution on a glass plate using a casting blade to form a thin layer with a thickness of 150 μm, the polymer solution spread on the glass plate was dried at 120° C. in a vacuum condition for 12 hours. After 12 hours, a vitrified hybrid membrane was dried again at 120° C. in a vacuum condition for 12 hours to remove residual solvent from the vitrified hybrid membrane to obtain a hybrid membrane. At this time, the obtained hybrid membrane is illustrated in FIG. 9 and FIG. 10, and exhibits uniformity and flexibility although types of polymer such as polysulfone (PSF), Matrimid 51215®, etc. are variously applied, high concentration AZIF-67 nanoparticles are applied (FIG. 10). In a hybrid membrane production process, NMP was used in a mass nine times that of the hybrid membrane. A hybrid membrane having various AZIF-67 nanoparticle contents was produced by the above-described method.

Membrane-Example 2

A hybrid membrane was produced using the same method and weight ratio as in the Membrane-Example 1 and using other nanoparticles ($AZIF-8-Bu_3N_5$) (FIG. 10). A polymer used at this time was a PI-based polymer called as Polyetherimide (Ultem®), and it was confirmed that the hybrid membrane exhibits uniformity and flexibility as the hybrid membrane obtained in Membrane-Example 1 (FIG. 10).

Membrane-Comparative Example 1

Membrane-Comparative Example 1 is a single polymer membrane which does not include AZIF nanoparticles or ZIF nanoparticles. After mixing 10 wt % of a 6FDA-DAM polymer with 90 wt % of NMP in a glass bottle to obtain a mixture, stirring the mixture through a roller for 12 hours to obtain a uniformly dissolved polymer solution, injecting a glass bottle containing the uniformly dissolved polymer solution into the ultrasonic pulverizer for 30 minutes to remove microbubbles in the solution, and spreading the polymer solution on a glass plate using a casting blade to form a thin layer with a thickness of 150 µm, the polymer solution spread on the glass plate was dried at 120° C. in a vacuum condition for 12 hours. After 12 hours, a vitrified membrane was dried again at 120° C. in a vacuum condition for 12 hours to remove residual solvent from the vitrified membrane to obtain a hybrid membrane.

Membrane-Comparative Example 2

A hybrid membrane was produced by the same method as in Membrane-Example 1 except that AZIF-67 nanoparticles were replaced with ZIF-67 nanoparticles.

Membrane-Comparative Example 3

A hybrid membrane was produced by the same method as in Example 1 except that AZIF-8 nanoparticles were replaced with ZIF-8 nanoparticles.

Comparative Example 1

Production of ZIF-67 Nanoparticles 2-methylimidazole and distilled water were well dissolved at a rotation speed of 300 rpm through stirring for 5 minutes by mixing 22.70 g of 2-methylimidazole with 80 g of distilled water in a 100 mL glass vial under a room temperature condition. Cobalt(II) nitrate hexahydrate and distilled water were well dissolved at a rotation speed of 300 rpm through stirring for 5 minutes by mixing 1.17 g of cobalt(II) nitrate hexahydrate with 8 g of distilled water in the 100 mL glass vial. Subsequently, two solutions were mixed in a 400 mL flask to obtain a mixed solution, and the mixed solution was precipitated under a room temperature condition for 12 hours to obtain a precipitation solution. After containing 18 mL of the precipitation solution in each of six 50 mL plastic containers for centrifugal separator and preparing the six 50 mL plastic containers for centrifugal separator having 18 mL of the precipitation solution contained in each thereof, a centrifugal separation process was performed at a rotation speed of 8,000 rpm for 30 minutes. In order to purify ZIF-67 nanoparticles obtained after performing the centrifugal separation process, a filtering process was progressed using a cellulose filter paper, and a filtered solid material was purified three times using 500 mL of methanol. Purified ZIF-67 nanoparticles were dried at 100° C. under a vacuum condition for 12 hours to obtain ZIF-67 nanoparticles. The obtained ZIF-67 nanoparticles had a weight of about 0.6 g.

Comparative Example 2

Production of ZIF-8 Nanoparticles 2-methylimidazole and distilled water were well dissolved at a rotation speed of 300 rpm through stirring for 5 minutes by mixing 22.70 g of 2-methylimidazole with 80 g of distilled water in a 100 mL glass vial under a room temperature condition. Zinc(II) nitrate hexahydrate and distilled water were well dissolved at a rotation speed of 300 rpm through stirring for 5 minutes by mixing 1.90 g of zinc(II) nitrate hexahydrate with 8 g of distilled water in the 100 mL glass vial. A ZIF-8 nanoparticle synthesis method thereafter was progressed in the same manner as the ZIF-67 nanoparticle synthesis method to obtain ZIF-8 nanoparticles, and the obtained ZIF-8 nanoparticles had a weight of about 0.8 g.

Experimental Example 1

AZIF-67 nanoparticles were compared with ZIF-67 nanoparticles using X-ray diffractiometry (XRD) to analyze crystal structure of AZIF-67 nanoparticles. A measurement operation was conducted at intervals of 0.01° from 5° to 30° based on 2θ at room temperature under a condition of CuKα λ=1.5406 A° using Rigaku Dmax2500 diffracting measurement system.

As illustrated in FIG. 3 to FIG. 5, AZIF-8 nanoparticles and AZIF-67 nanoparticles exhibit relatively reduced distances between crystal surfaces when comparing crystal structures of AZIF-8 nanoparticles and AZIF-67 nanoparticles with those of general ZIF-8 nanoparticles and ZIF-67 nanoparticles, AZIF-8 nanoparticles and AZIF-67 nanoparticles show a phenomenon that (002) and (112) crystal surfaces are greatly grown when 10 as a molar ratio of $Bu_3N$ is used compared to a metal precursor, and AZIF-8 nanoparticles and AZIF-67 nanoparticles show the same tendency although only 5 as a molar ratio of $Hx_3N$ is used. Through these, it is confirmed that a sodalite (SOD) structure, i.e., a basic structure of ZIF-67 nanoparticles or ZIF-8 nanoparticles is maintained except for variations in a distance between the crystal surfaces and nature of a specific crystal surface (FIG. 3 and FIG. 4). Further, it is confirmed that the AZIF-8 nanoparticles also have a crystal structural change similar to that of the AZIF-67 nanoparticles (FIG. 5).

Experimental Example 2

Thermogravimetric analysis (TGA) was progressed to evaluate thermal stability of AZIF-67 nanoparticles and AZIF-8 nanoparticles having various alkylamine groups introduced thereinto. A measurement operation was performed by recording weight changes of respective nanoparticles according to temperature variation in a temperature increasing rate of 5° C./min from 25° C. to 800° C. while maintaining a flow rate of 50 cc/min under a $N_2$ gas condition using Mettler Toledo TGA1 equipment.

As illustrated in FIG. 12, it is confirmed that a decrease in weight of ZIF-67 nanoparticles is started at a temperature near about 250° C., and weight of the ZIF-67 nanoparticles is decreased as much as about 15 wt % at a temperature near 500° C.

Experimental Example 3

AZIF-67 nanoparticles and AZIF-8 nanoparticles were compared with ZIF-67 nanoparticles and ZIF-8 nanoparticles using Brunauer-Emmett-Teller (BET) equipment to analyze surface areas of AZIF-67 nanoparticles and AZIF-8 nanoparticles having an alkylamine group introduced thereinto. A BET measurement operation was progressed using Micrometrics ASAP 2020 under conditions of $N_2$ and 77K. The pretreated AZIF-67 nanoparticles and AZIF-8 nanoparticles were used after pretreating AZIF-67 nanoparticles and AZIF-8 nanoparticles at 120° C. under a vacuum condition for 3 hours before conducting the BET measurement operation of the AZIF-67 nanoparticles and AZIF-8 nanoparticles.

Figure 18:
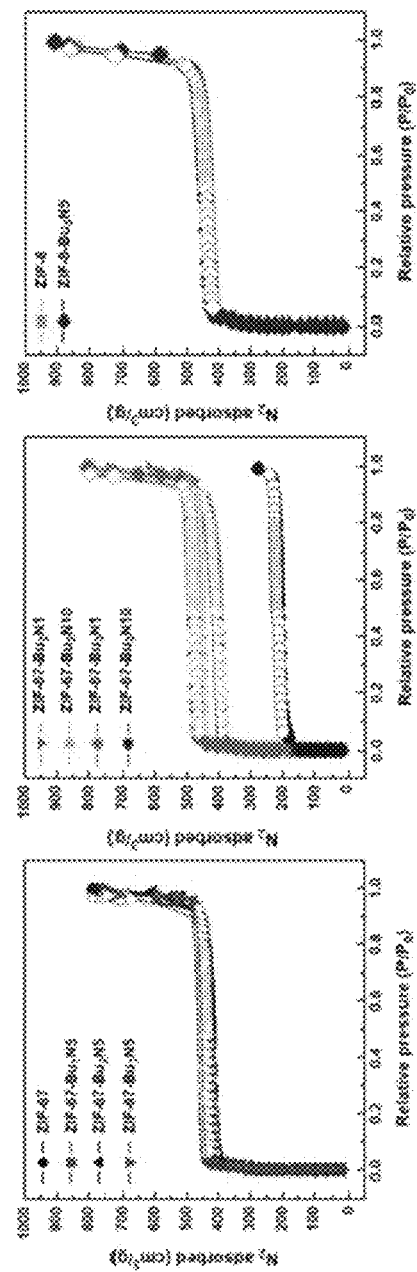
FIG. 18 is Brunauer-Emmett-Teller (BET) isothermal graphs of AZIF-67 nanoparticles and AZIF-8 nanoparticles in an embodiment of the present invention.

As illustrated in FIG. 18, a phenomenon that a $N_2$ adsorption curve is reduced is shown when an alkylamine is used at a molar ratio of 10 compared to a metal precursor although a similar tendency is shown when comparing the AZIF-67 nanoparticles and AZIF-8 nanoparticles with general ZIF-67 nanoparticles and ZIF-8 nanoparticles in an isothermal analysis graph according to pressure variations of AZIF-67 nanoparticles and AZIF-8 nanoparticles having an alkylamine group introduced thereinto.

Experimental Example 4

Figure 19:
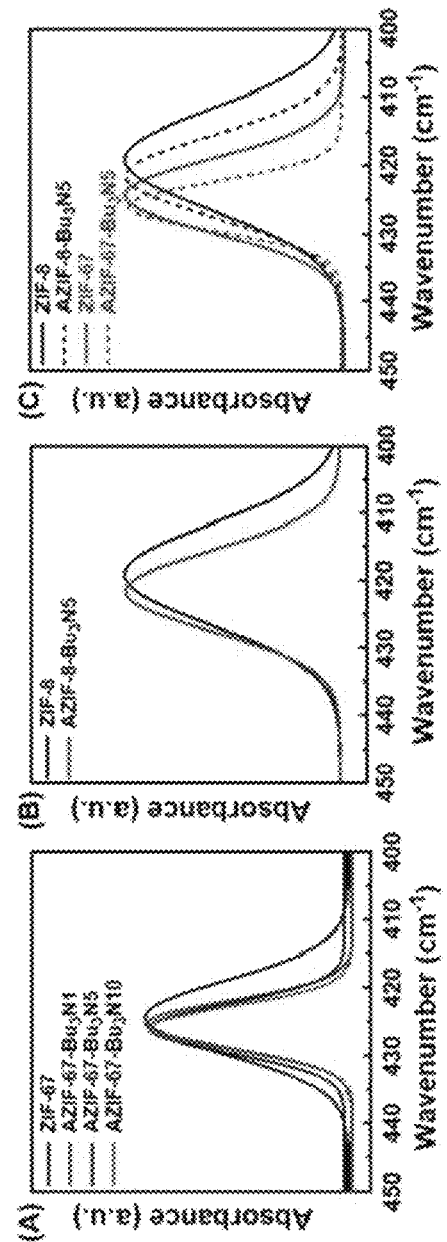
FIG. 19 is Fourier transform infrared spectroscopy (FT-IR) graphs obtained by analyzing ionic bonding strength values between metals of AZIF-8 nanoparticles and AZIF-67 nanoparticles and an organic ligand in an embodiment of the present invention.

Mechanical coupling strength variations between an organic ligand and a metal (metal ions) in AZIF-67 nanoparticles and AZIF-8 nanoparticles were analyzed through Fourier transform infrared (FT-IR) spectrometer (FIG. 19). A measurement operation was conducted by scanning a wavenumber range from 400 $cm^{-1}$ to 4,000 $cm^{-1}$ at room temperature and a speed of 1.9285 cm/sec using Nicolet iS50 of Thermo Fisher Scientific Inc. Each of measurement samples was prepared by pressing the mixture into a circular pellet with a diameter of 1 cm after mixing the AZIF-67 nanoparticles and AZIF-8 nanoparticles with KBr at a ratio of 1:100 based on the weight percentage using potassium bromide (KBr, ≥99% FT-IR grade) purchased from Sigma Aldrich.

As illustrated in FIG. 19, a phenomenon that a peak is moved to a relatively high wavenumber is confirmed when comparing AZIF nanoparticles with ZIF nanoparticles. Through this, it is confirmed that coupling strength between metal and an organic ligand is relatively more increased by the introduction of an alkylamine, and it is confirmed that a larger change in the coupling strength occurs in AZIF-8 nanoparticles than AZIF-67 nanoparticles.

More specifically, a peak associated with a bond (N—Co) between an amine of an organic connector and metal ions is shown at 424.4 $cm^{-1}$ in case of general ZIF-67 nanoparticles, the peak is moved to 426.2 $cm^{-1}$ in case of AZIF-67-$Bu_3N_5$ nanoparticles, thereby exhibiting a difference of about 1.8 $cm^{-1}$, a peak associated with N—Zn is shown at 419.1 $cm^{-1}$ in case of ZIF-8 nanoparticles, and a peak is shown at 421.6 $cm^{-1}$ in case of AZIF-8-$Bu_3N_5$ nanoparticles, thereby exhibiting a difference of about 2.5 $cm^{-1}$. Further, it is shown that an amine coupling extent of metal ions and a ligand becomes more constant by exhibiting a narrower distribution degree in case of AZIF nanoparticles. For instance, M-N coupling strength may be variously existed in ZIF nanoparticles since portions such as metal vacancy, dangling linker and linker vacancy, i.e., types of defects are existed such that M-N coupling number and types within a basic unit cell are variously existed. However, it is seen that AZIF nanoparticles have a little more uniform M-N coupling strength by allowing alkylamine to promote dehydrogenation of the organic connector, thereby coupling alkylamine to such a portion as linker vacancy. It can be confirmed through this that alkylamine is directly combined with metal.

An IR peak of Co—N of AZIF-67 nanoparticles may be increased as much as 1 to 3 $cm^{-1}$ by an alkylamine-based organic ligand. Namely, the IR peak of Co—N is increased as much as 1 to 3 $cm^{-1}$. Likewise, an IR peak of Zn—N of AZIF-8 nanoparticles may be increased as much as 1.5 to 4 $cm^{-1}$ by an alkylamine-based organic ligand.

Experimental Example 5

Cross section of the membrane was photographed by SEM using AZIF-67 nanoparticles and a hybrid membrane as targets. A photographing operation was conducted using Inspect F FEG-SEM equipment at room temperature under a vacuum condition.

As illustrated in FIG. 6, although sizes of AZIF-67 nanoparticles are confirmed to be about 50 nm, the sizes of the AZIF-67 nanoparticles are not limited to 50 nm, but may be smaller than 50 nm when combining the sizes of the AZIF-67 nanoparticles with DLS analysis results of FIG. 1. As illustrated in FIG. 11, it is confirmed that the nanoparticles are uniformly dispersed in a polymer matrix without an agglomeration phenomenon of the nanoparticles even when the nanoparticles are introduced at a high concentration into a hybrid membrane based on AZIF-67 nanoparticles of Example 7. Further, it is confirmed that compatibility between polymer and the nanoparticles is very good.

Experimental Example 6

TGA was progressed to check weight percentage of AZIF-67 nanoparticles within a hybrid membrane produced in Membrane-Example 1. A measurement operation was progressed by maintaining a flow rate of 50 $cm^3$/sec at a heating speed of 5° C./min from 25° C. to 800° C. under an air condition using Mettler Toledo TGA1 equipment.

Figure 20:
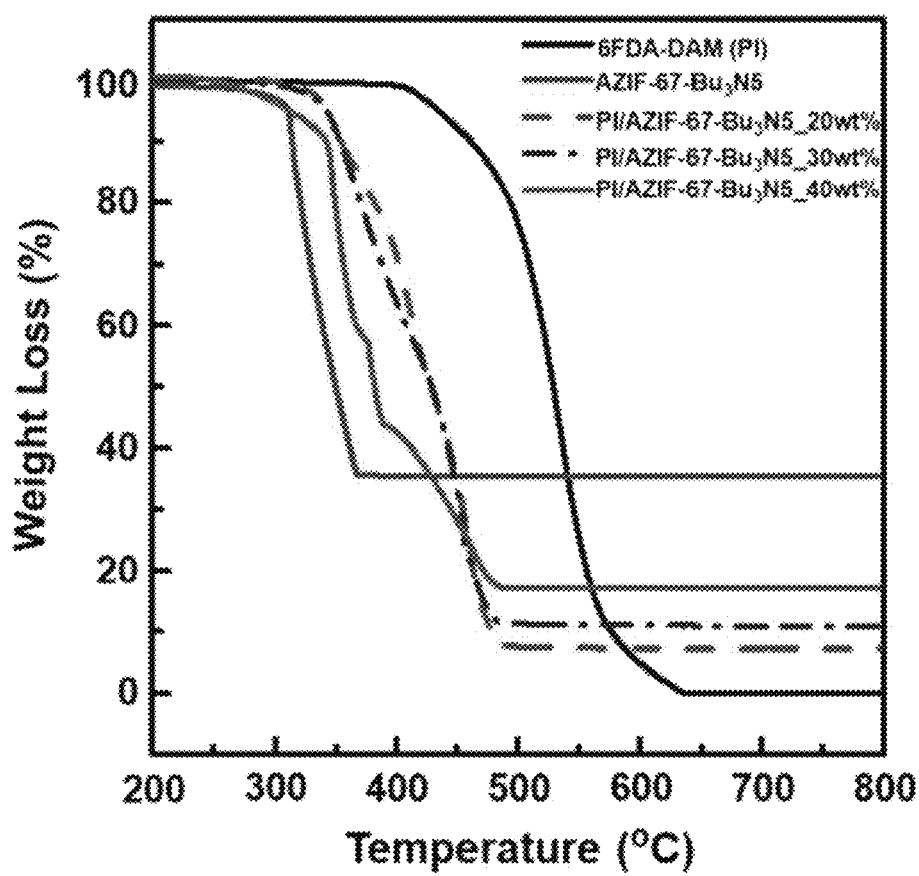
FIG. 20 is a graph illustrating, through thermogravimetric analysis (TGA), weight percentages of the AZIF-67 nanoparticles within a hybrid membrane produced using AZIF-67 nanoparticles synthesized according to an embodiment of the present invention.

As illustrated in FIG. 20, weight of 6FDA-DAM polymer was decreased from 100 wt % to 0 wt % after performing TGA of 6FDA-DAM polymer up to 800° C., and weight of AZIF-67 nanoparticles was decreased from 100 wt % to 35.5 wt % after performing TGA of AZIF-67 nanoparticles up to 800° C. Weight of a hybrid membrane containing 20 wt % of the AZIF-67 nanoparticles was decreased from 100 wt % to 7.0 wt %, and weight of a hybrid membrane containing 30 wt % of the AZIF-67 nanoparticles was decreased from 100 wt % to 10.8 wt %. Finally, weight of a hybrid membrane containing 40 wt % of the AZIF-67 nanoparticles was decreased from 100 wt % to 15.9 wt %. All of residues remained after performing TGA of the AZIF-67 nanoparticles and a hybrid membrane containing the AZIF-67 nanoparticles mean cobalt oxide (CoO), and weight percentage of pure Co can be calculated using a molecular weight ratio of Co to 0 within CoO. Therefore, actual weight percentage of the AZIF-67 nanoparticles within the hybrid membrane can be calculated by dividing all of Co weight percentages of the hybrid membrane exhibiting weight percentages which are different from each other by Co weight percentage of the AZIF-67 nanoparticles. As a result, it is confirmed that actual weight percentage of the AZIF-67 nanoparticles within the hybrid membrane produced in Membrane-Example 1 is almost the same as a theoretic weight percentage, and this is represented in Table 2.

TABLE 2

|  | CoO wt % | Co wt % | Actual ZIF-67-$BU_3N_5$ wt % |
| --- | --- | --- | --- |
| ZIF-67-$Bu_3N_5$ | 35.5 | 27.9 | — |
| Membrane-Example 1 (20 wt %) | 7.0 | 5.5 | 19.7 |
| Membrane-Example 1 (30 wt %) | 10.8 | 8.5 | 30.5 |
| Membrane-Example 1 (40 wt %) | 15.9 | 12.5 | 45.5 |

Experimental Example 7

Permeability values of single gases, i.e., $C_3H_6$ and $C_3H_8$, and $C_3H_6/C_3H_8$ selectivity values for hybrid membranes or membranes produced in Membrane-Examples and Membrane-Comparative Examples were measured. Specifically, permeability values and selectivity values of respective gases were measured using a permeability device with a predetermined volume at conditions of 2 atm and 35° C. Permeability and selectivity values of the hybrid membranes were measured by conducting a leak test before carrying out a measurement operation after putting each of the hybrid membranes into the permeability device and maintaining the hybrid membranes in a vacuum state for 24 hours or more. Permeation rates and leak rates in a steady state of gas passing through the hybrid membranes were used in calculation of permeability and selectivity values. The selectivity values were calculated using ratios of $C_3H_6$ permeability values to $C_3H_8$ permeability values of the respective hybrid membranes.

As represented in Table 3, it is confirmed that both $C_3H_6$ permeability and $C_3H_6/C_3H_8$ selectivity are increased in a hybrid membrane (Membrane-Example 1) produced by including AZIF-67 nanoparticles compared to a hybrid membrane containing ZIF-67 nanoparticles of Membrane-Comparative Example 2 in the same amount as the AZIF-67 nanoparticles. Although the hybrid membrane containing 20 wt % of the nanoparticles of Membrane-Example 1 has the same nanoparticle content as the hybrid membrane of Membrane-Comparative Example 2, the hybrid membrane of Membrane-Example 1 exhibits higher $C_3H_6$ permeability and $C_3H_6/C_3H_8$ selectivity than the hybrid membrane of Membrane-Comparative Example 2. Further, when 30 wt % or more of ZIF-67 nanoparticles were included in 6FDA-DAM polymer differently from a hybrid membrane containing 30 wt % of AZIF-67 nanoparticles (Membrane-Example 1), an agglomeration phenomenon due to a high particle content within the polymer was observed, and it was impossible to measure permeability values due to low mechanical properties of the hybrid membrane accordingly.

TABLE 3

| Sample | $C_3H_6$ permeability (Barrer) | $C_3H_8$ permeability (Barrer) | $C_3H_6/C_3H_8$ selectivity (—) |
|---|---|---|---|
| Membrane-Comparative Example 1 6FDA-DAM | 16.63 | 1.47 | 11.3 |
| Membrane-Comparative Example 2 (20 wt %) | 34.14 | 1.14 | 29.9 |
| Membrane-Example 1 (20 wt %) | 41.80 | 1.15 | 36.5 |
| Membrane-Example 2 (30 wt %) | 49.78 | 1.06 | 47.0 |
| Membrane-Example 3 (40 wt %) | 62.09 | 1.07 | 58.2 |

It is confirmed that AZIF-67 nanoparticles enable a hybrid membrane containing 40 wt % of the nanoparticles to be produced without a particle agglomeration phenomenon, and enable a high $C_3H_6$ permeability corresponding to 62 Barrer and a high $C_3H_6/C_3H_8$ selectivity corresponding to 58.2 to be obtained.

As represented in Table 4, it is confirmed that a hybrid membrane produced in Membrane-Example 2 including 20 wt % of AZIF-8-$Bu_3N_5$ nanoparticles exhibits higher $C_3H_6$ permeability and $C_3H_6/C_3H_8$ selectivity at 35° C. than a hybrid membrane of Membrane-Comparative Example 3 produced using the same amount of ZIF-8 nanoparticles as the AZIF-8-$Bu_3N_5$ nanoparticles.

TABLE 4

| Sample | $C_3H_6$ permeability (Barrer) | $C_3H_8$ permeability (Barrer) | $C_3H_6/C_3H_8$ selectivity (—) |
|---|---|---|---|
| Membrane-Comparative Example 1 | 16.63 | 1.47 | 11.3 |
| Membrane-Comparative Example 3 (20 wt %) | 37.73 | 1.82 | 20.7 |
| Membrane-Example 2 (20 wt %) | 41.05 | 1.64 | 25.0 |

TABLE 5

| Sample | Measurement temperature (° C.) | $C_3H_6$ permeability (Barrer) | $C_3H_8$ permeability (Barrer) | $C_3H_6/C_3H_8$ selectivity (—) |
|---|---|---|---|---|
| Membrane-Comparative Example 1 | 35 | 16.63 | 1.47 | 11.3 |
|  | 50 | 19.40 | 1.92 | 10.1 |
|  | 70 | 22.31 | 2.45 | 9.1 |
| Membrane-Comparative Example 2 (20 wt %) | 35 | 34.14 | 1.14 | 29.9 |
|  | 50 | 37.16 | 1.58 | 23.6 |
|  | 70 | 40.82 | 2.23 | 18.3 |
| Membrane-Example 1 (20 wt %) | 35 | 41.80 | 1.15 | 36.5 |
|  | 50 | 43.74 | 1.35 | 27.2 |
|  | 70 | 46.97 | 1.56 | 20.5 |

Figure 21:
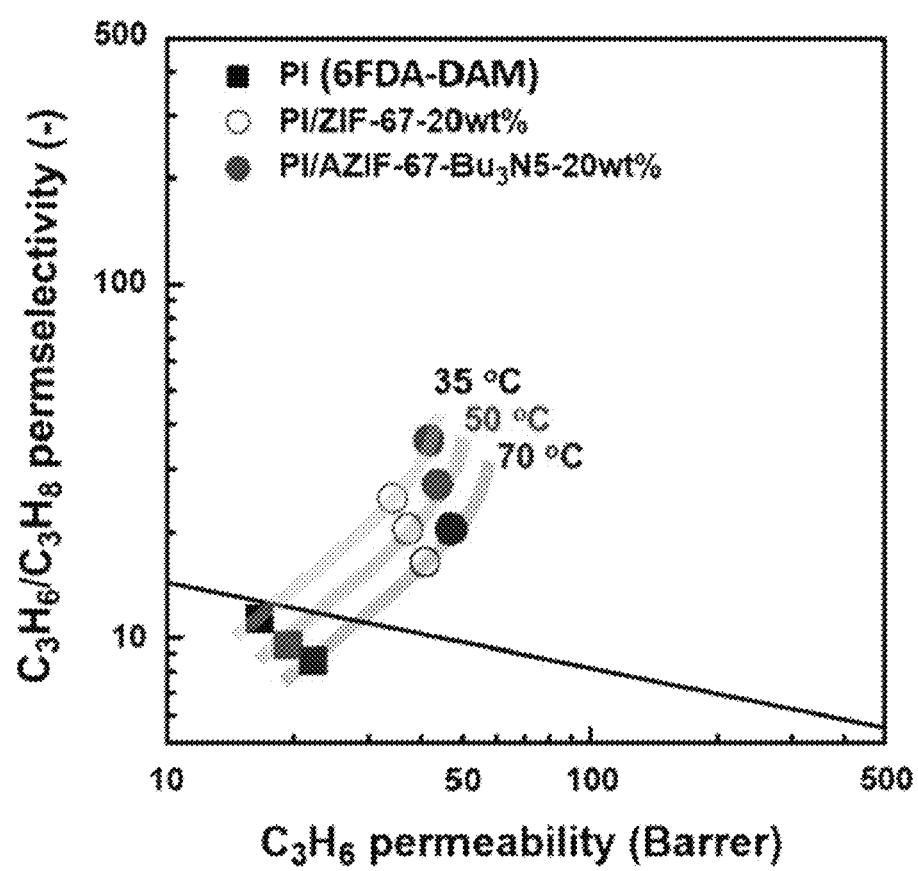
FIG. 21 is a graph illustrating $C_3H_6/C_3H_8$ single gas separation performance according to temperature of a 6FDA-DAM polyimide (PI) polymer membrane, a hybrid membrane produced by mixing an alkylamine with 20 wt % of untreated ZIF-67 nanoparticles, and a hybrid membrane produced by mixing the alkylamine with synthesized AZIF-67 nanoparticles into which an alkylamine group is introduced according to an embodiment of the present invention.

Confirmed was $C_3H_6/C_3H_8$ single gas separation performance of hybrid membranes containing various nanoparticles and having various concentration values according to measurement temperature variations of 35° C., 50° C. and 70° C. at a pressure condition of 2 atm using the same measuring method as in the above experiments. As shown in FIG. 21 and Table 5, all produced hybrid membranes or membranes exhibit a tendency of increasing $C_3H_6$ permeability and decreasing $C_3H_6/C_3H_8$ selectivity according to an increase in measurement temperatures, and separation performance of a hybrid membrane containing AZIF-67 nanoparticles (i.e., ZIF-67-$Bu_3N_5$ nanoparticles) exhibits higher $C_3H_6$ permeability and $C_3H_6/C_3H_8$ selectivity at the same conditions than separation performance of a hybrid membrane containing ZIF-67 nanoparticles.

TABLE 6

| Sample | Gas | $D^a$ | $S^b$ | P (Barrer) | $\alpha_D$ | $\alpha_S$ | $\alpha_P$ |
|---|---|---|---|---|---|---|---|
| | | | | | $C_3H_6/C_3H_8$ (—) | | |
| Membrane-Comparative Example 1 | $C_3H_6$ | 5.29E−09 | 3.17E−01 | 16.63 | 10.4 | 1.1 | 11.3 |
| | $C_3H_8$ | 5.16E−10 | 2.78E−01 | 1.47 | | | |
| Membrane-Comparative Example 1 50° C. | $C_3H_6$ | 7.99E−09 | 2.43E−01 | 19.40 | 9.5 | 1.1 | 10.1 |
| | $C_3H_8$ | 8.44E−10 | 2.28E−01 | 1.92 | | | |
| Membrane-Comparative Example 1 70° C. | $C_3H_6$ | 1.17E−08 | 1.90E−01 | 22.31 | 8.6 | 1.1 | 9.1 |
| | $C_3H_8$ | 1.37E−09 | 1.79E−01 | 2.45 | | | |
| Membrane-Comparative Example 2 20 wt %_35° C. | $C_3H_6$ | 7.72E−09 | 4.40E−01 | 34.14 | 24.8 | 1.2 | 29.9 |
| | $C_3H_8$ | 3.11E−10 | 3.70E−01 | 1.14 | | | |
| Membrane-Comparative Example 2 20 wt %_50° C. | $C_3H_6$ | 1.08E−08 | 3.35E−01 | 37.16 | 20.4 | 1.1 | 23.6 |
| | $C_3H_8$ | 5.29E−10 | 2.92E−01 | 1.58 | | | |
| Membrane-Comparative Example 2 20 wt %_70° C. | $C_3H_6$ | 1.52E−08 | 2.66E−01 | 40.82 | 16.5 | 1.1 | 18.3 |
| | $C_3H_8$ | 9.20E−10 | 2.41E−01 | 2.23 | | | |
| Membrane-Example 1 20 wt %_35° C. | $C_3H_6$ | 1.20E−08 | 3.48E−01 | 41.80 | 36.1 | 1.0 | 36.5 |
| | $C_3H_8$ | 3.32E−10 | 3.45E−01 | 1.15 | | | |
| Membrane-Example 1 20 wt %_50° C. | $C_3H_6$ | 1.63E−08 | 2.69E−01 | 43.74 | 27.1 | 1.0 | 27.2 |
| | $C_3H_8$ | 6.10E−10 | 2.68E−01 | 1.35 | | | |
| Membrane-Example 1 20 wt %_70° C. | $C_3H_6$ | 2.28E−08 | 2.06E−01 | 46.97 | 20.4 | 1.0 | 20.5 |
| | $C_3H_8$ | 1.12E−09 | 2.05E−01 | 1.56 | | | |

*a: Diffusivity (D, $cm^2$/sec)
*b: Solubility (S, cc (STP)/cc Poly/cmHg)

Table 6 is a table representing $C_3H_6/C_3H_8$ single gas separation performance, diffusivity, solubility, diffusivity selectivity, and solubility selectivity according to temperatures of a hybrid membrane produced using AZIF-67 nanoparticles according to an embodiment of the present invention. Permeability activation energy ($E_P$), diffusivity activation energy ($E_D$) and heat of sorption ($H_S$) values for each gas of each of hybrid membranes were calculated using Arrhenius equation based on numerical values represented in Table 6, and the calculated $E_P$, $E_D$ and $H_S$ values are represented in Table 7.

TABLE 7

| Sample | Gas | $E_P$ (kJ/mol) | $E_D$ (kJ/mol) | $H_S$ (kJ/mol) |
|---|---|---|---|---|
| Membrane-Comparative Example 1 | $C_3H_6$ | 7.3 | 20.4 | −13.1 |
| | $C_3H_8$ | 12.2 | 24.4 | −12.2 |
| Membrane-Comparative Example 2 20 wt % | $C_3H_6$ | 4.9 | 16.8 | −11.9 |
| | $C_3H_8$ | 16.7 | 31.6 | −14.6 |
| Membrane-Example 1 20 wt % | $C_3H_6$ | 2.9 | 16.1 | −13.2 |
| | $C_3H_8$ | 17.3 | 34.2 | −16.9 |

As represented in Table 7, it can be confirmed that $E_P$ values of hybrid membranes containing ZIF-67 nanoparticles and AZIF-67 nanoparticles are decreased compared to $E_P$ value of a 6FDA-DAM polymer membrane for $C_3H_6$, and particularly it can be confirmed that $E_P$ value of a hybrid membrane containing the AZIF-67 nanoparticles is the lowest, i.e., 2.9. On the other hand, it can be confirmed that $E_P$ values of hybrid membranes containing ZIF-67 nanoparticles and AZIF-67 nanoparticles are increased compared to $E_P$ value of a 6FDA-DAM polymer membrane for $C_3H_8$, and particularly it can be confirmed that $E_P$ value of a hybrid membrane containing the AZIF-67 nanoparticles is the highest, i.e., 17.3. Through this, it can be seen that the ZIF-67 nanoparticles and AZIF-67 nanoparticles are effective in $C_3H_6/C_3H_8$ gas separation, and it can be seen that the AZIF-67 nanoparticles exhibit more effective $C_3H_6/C_3H_8$ separation performance than the ZIF-67 nanoparticles.

TABLE 8

| Sample | Energetic selectivity (—) | Entropic selectivity (—) | Diffusivity selectivity (—) |
|---|---|---|---|
| Membrane-Comparative Example 1 | 4.8 | 2.1 | 10.1 |
| Membrane-Comparative Example 220 wt % | 322.7 | 0.08 | 24.8 |

TABLE 8-continued

| Sample | Energetic selectivity (—) | Entropic selectivity (—) | Diffusivity selectivity (—) |
|---|---|---|---|
| Membrane-Example 220 wt % | 1170.2 | 0.03 | 36.1 |

In general, selectivity in $C_3H_6/C_3H_8$ gas separation is determined by diffusivity selectivity. The diffusivity selectivity is may again be represented by a multiplication of energetic selectivity associated with size of the membrane or gas molecules passing through pores of the membrane and entropic selectivity associated with pore structure of the membrane or shape of the gas molecules passing through the pores of the membrane, and respective energetic selectivity values and entropic selectivity values of the 6FDA-DAM polymer membrane and hybrid membranes containing 20 wt % of ZIF-67 nanoparticles and 20 wt % of AZIF-67-Bu$_3$N$_5$ nanoparticles according to Examples are represented in Table 8.

As represented in Table 8, it can be seen that $C_3H_6/C_3H_8$ energetic selectivity is remarkably increased in a hybrid membrane containing ZIF-67 nanoparticles or AZIF-67 nanoparticles (i.e., ZIF-67-Bu$_3$N$_5$ nanoparticles) compared to a 6FDA-DAM polymer. Particularly, it is confirmed that a hybrid membrane containing AZIF-67-Bu$_3$N$_5$ nanoparticles exhibits an improved energetic selectivity, i.e., 1170.2 compared to a hybrid membrane containing the ZIF-67 nanoparticles. Meanwhile, it can be seen that $C_3H_6/C_3H_8$ entropic selectivity is significantly decreased in a hybrid membrane containing ZIF-67 nanoparticles or AZIF-67 nanoparticles (i.e., AZIF-67-Bu$_3$N$_5$ nanoparticles) compared to the 6FDA-DAM polymer. Particularly, it is confirmed that a hybrid membrane containing the AZIF-67-Bu$_3$N$_5$ nanoparticles exhibits a very low energetic selectivity, i.e., 0.03 compared to a hybrid membrane containing the ZIF-67 nanoparticles.

Such results not only show that the ZIF-67 nanoparticles can effectively separate $C_3H_6$ and $C_3H_8$ gases according to sizes thereof, but also exhibit that the AZIF-67-Bu$_3$N$_5$ nanoparticles can more effectively separate the $C_3H_6$ and $C_3H_8$ gases according to sizes thereof within the hybrid membrane than the ZIF-67 nanoparticles. This can be interpreted as a result generated when a sieving function for $C_3H_6/C_3H_8$ separation is remarkably increased while an ionic bond between Co and N is becoming strong as it can be confirmed in FIG. 19 showing FT-IR results of ZIF-67-Bu$_3$N$_5$ nanoparticles.

Through such results, it is confirmed that it can be possible to produce a hybrid membrane having excellent $C_3H_6/C_3H_8$ separation performance by using AZIF-67 nanoparticles and AZIF-8 nanoparticles compared to ZIF-67 nanoparticles and ZIF-8 nanoparticles during the production of a $C_3H_6/C_3H_8$ gas separation membrane.

A hybrid membrane according to the present invention can accomplish excellent separation performance according to a target gas to be separated by having an interface with good compatibility formed between polymer and nanoparticles. Therefore, the hybrid membrane can improve separation performance of an existing polymer separation membrane, and can effectively separate separation-recalcitrant gas molecules particularly including $C_3H_6/C_3H_8$, $C_2H_4/C_2H_6$, $CO_2/CH_4$, $CO_2/CO$, $CO_2/N_2$, $N_2/CH_4$ and n-$C_4$/i-$C_4$ (n-butane/iso-butane) as well as $H_2/CH_4$, $H_2/C_3H_6$, and $H_2/C_3H_8$.

The aforementioned description of the present invention is for illustration only, and it can be understood by those of ordinary skill in the art that the present invention can be easily modified into other detailed examples without changing technical ideas or essential features of the present invention.

What is claimed is:

1. A hybrid membrane comprising:
    a polymer matrix; and
    nanoparticles which are dispersed in the polymer matrix and include a zeolitic imidazolate framework (ZIF),
    wherein the nanoparticles include: metal ions; and an organic ligand coupled to the metal ions, and the organic ligand includes an imidazolate-based organic ligand and an alkylamine-based organic ligand,
    wherein the organic ligand has a ratio of the imidazolate-based organic ligand to the alkylamine-based organic ligand of 99.9 wt %:0.1 wt % to 80 wt %:20 wt %,
    wherein the metal ions are obtained from metal precursor,
    wherein the metal precursor is acetate-based metal salt,
    wherein the metal ions are zinc,
    wherein a distance between (011) crystal surfaces of the AZIF nanoparticles is 12.0 Å to 12.25 Å, and
    wherein the nanoparticles exhibit a mass decrease of 3% or less within 400° C. in thermogravimetric analysis (TGA) test and an IR peak of Zn—N of the AZIF nanoparticles is increased by 1.5 to 4 cm$^{-1}$ by the alkylamine-based organic ligand.

2. The hybrid membrane of claim 1, wherein at least one of a distance between crystal surfaces, and distribution and coupling strength of the crystal surfaces in the nanoparticles is adjusted according to use ratio of the alkylamine-based organic ligand, and the alkylamine-based organic ligand is directly combined with the metal ions.

3. The hybrid membrane of claim 1, wherein the nanoparticles have a particle size of 100 nm or less and a pore size of 0.1 to 1 nm.

4. The hybrid membrane of claim 1, wherein the membrane comprises 15 to 60 wt % of the nanoparticles.

5. The hybrid membrane of claim 1, wherein the membrane comprises 30 to 60 wt % of the nanoparticles.

6. The hybrid membrane of claim 1, wherein the membrane has a thickness of 50 nm to 100 μm.

7. The hybrid membrane of claim 1, wherein the polymer matrix is formed by comprising any one selected from the group consisting of polyimide, polysufone (PSF), polyethersulfone (PES), cellulose acetate (CA), polydimethylsiloxane (PDMS), and polyvinyl acetate (PVAc).

8. The hybrid membrane of claim 1, wherein the membrane enables gases with a molecular size difference of 0.1 to 5 Å to be separated from each other.

9. The hybrid membrane of claim 1, wherein the membrane separates a mixed gas of a gas set selected from the group of gas sets consisting of C3H6/C3H8, C2H4/C2H6, CO2/CH4, CO2/CO, CO2/N2, N2/CH4, n-C4/i-C4 (n-butane/iso-butane), H2/CH4, H2/C3H8, and H2/C3H6.

10. The hybrid membrane of claim 1, wherein the nanoparticles have a permeability to C3H6 of 300 to 600 Barrer and a C3H6/C3H8 selectivity of 140 to 300 at 35° C.

11. The hybrid membrane of claim 1, wherein the membrane has a permeability to C3H6 of 40 to 80 Barrer and a C3H6/C3H8 selectivity of 22 to 40 at 35° C.

12. A gas separation method comprising the step of separating one or more gases from a mixed gas including two or more gases using the hybrid membrane according to claim 1.

13. The gas separation method of claim 12, comprising passing the mixed gas through the membrane, thereby enabling the gases to be separated from each other using a molecular size difference of gases included in the mixed gas.

14. The gas separation method of claim 12, wherein the gases included in the mixed gas have a molecular size difference of 0.1 to 5 Å.

* * * * *